US012573898B2

(12) United States Patent
Tokuhisa et al.

(10) Patent No.: US 12,573,898 B2
(45) Date of Patent: Mar. 10, 2026

(54) ROTOR, ROTARY ELECTRIC MACHINE, AND METHOD OF MANUFACTURING THE ROTARY ELECTRIC MACHINE

(71) Applicant: Mitsubishi Electric Corporation, Tokyo (JP)

(72) Inventors: Taichi Tokuhisa, Tokyo (JP); Ryo Nabika, Tokyo (JP); Takeshi Yagi, Tokyo (JP); Hiroki Aso, Tokyo (JP); Takanori Watanabe, Tokyo (JP); Akiko Tatebe, Tokyo (JP); Kazuya Harada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 263 days.

(21) Appl. No.: 18/547,890

(22) PCT Filed: May 12, 2022

(86) PCT No.: PCT/JP2022/020044
§ 371 (c)(1),
(2) Date: Aug. 25, 2023

(87) PCT Pub. No.: WO2022/239829
PCT Pub. Date: Nov. 17, 2022

(65) Prior Publication Data
US 2024/0136873 A1      Apr. 25, 2024
US 2024/0235293 A9      Jul. 11, 2024

(30) Foreign Application Priority Data

May 14, 2021      (JP) ................................. 2021-082085

(51) Int. Cl.
*H02K 1/27*           (2022.01)
*H02K 1/276*          (2022.01)
(Continued)

(52) U.S. Cl.
CPC ............. *H02K 1/276* (2013.01); *H02K 15/03* (2013.01); *H02K 15/12* (2013.01)

(58) Field of Classification Search
CPC ........ H02K 1/276; H02K 15/03; H02K 15/12; H02K 1/2746; H02K 15/028; H02K 15/035; H02K 15/121
See application file for complete search history.

(56) References Cited

U.S. PATENT DOCUMENTS

| | | |
|---|---|---|
| 2015/0145366 A1 | 5/2015 | Akashi et al. |
| 2020/0059122 A1 | 2/2020 | Kitagaki et al. |
| 2020/0185987 A1* | 6/2020 | Okazaki ................... H02K 1/16 |

FOREIGN PATENT DOCUMENTS

| | | |
|---|---|---|
| JP | 2002171702 A | 6/2002 |
| JP | 2004088908 A | 3/2004 |

(Continued)

OTHER PUBLICATIONS

International Search Report (PCT/ISA/210) with translation and Written Opinion (PCT/ISA/237) mailed on Jul. 19, 2022, by the Japanese Patent Office as the International Searching Authority for International Application No. PCT/JP2022/020044. (13 pages).

*Primary Examiner* — Thomas Truong
(74) *Attorney, Agent, or Firm* — BUCHANAN, INGERSOLL & ROONEY PC

(57) ABSTRACT

A rotor includes a first resin portion formed the periphery of a main shaft; a first core disposed the outer circumferential portion of the first resin portion; a magnet attached to the radial outside of the first core; and a second core disposed the radially outside end face of the magnet, wherein a plurality of structures in each of which the magnet is sandwiched between the first and second cores are disposed circumferentially around the main shaft, and a second resin portion is formed between the circumferential end faces of adjacent second cores and between the circumferential end (Continued)

faces of adjacent magnets, wherein the first core has a division surface on which the circumferential end faces of itself and an adjacent first core are in surface contact with each other, and wherein the second core is not in contact with an adjacent second core.

20 Claims, 27 Drawing Sheets

(51) Int. Cl.
    H02K 15/03         (2025.01)
    H02K 15/12         (2006.01)

(56)                References Cited

FOREIGN PATENT DOCUMENTS

| JP | 2005168128 A | 6/2005 | |
| JP | 2006352973 A | 12/2006 | |
| JP | 2007060860 A | 3/2007 | |
| JP | 2007181304 A | 7/2007 | |
| JP | 2013074660 A | 4/2013 | |
| JP | 2015104244 A | 6/2015 | |
| WO | 2018180692 A1 | 10/2018 | |
| WO | WO-2020090007 A1 * | 5/2020 | ........... H02K 1/2746 |

\* cited by examiner

ROTOR, ROTARY ELECTRIC MACHINE, AND METHOD OF MANUFACTURING THE ROTARY ELECTRIC MACHINE

TECHNICAL FIELD

The present application relates to the field of a rotor, a rotary electric machine, and a method of manufacturing the rotary electric machine.

BACKGROUND ART

A rotary electric machine of an IPM (Interior Permanent Magnet) structure which is configured of a stator, which is formed of an armature on the annular core of which a winding is wound, and a rotor, in which a plurality of magnets are circumferentially disposed at predetermined spaced intervals inside the core, has heretofore been known. The IPM structure is superior in that a rare-earth magnet high in residual flux density and strong in holding power can be used at a high yield rate, but there has been a problem in that in order to integrally connect cores disposed radially inside and outside the magnets, it is necessary to provide a bridge core (a bridge) between circumferentially adjacent magnets, and one portion of the magnetic flux of a magnet leaks to an adjacent magnet via the bridge, so that the magnetic flux cannot be utilized effectively.

In order to solve the above-described problem, there has heretofore been provided a rotor and a motor wherein the bridge is abolished, the cores are separated from the radial inside and outside of the magnet, a resin is filled in void portions between circumferential adjacent magnets, and resin portions are fixed by recessed portions provided in radially inside cores, thereby reducing a flux leakage (for example, refer to PTL 1).

CITATION LIST

Patent Literature

PTL 1: WO2018-180692 A1

SUMMARY OF INVENTION

Technical Problem

However, there has been a problem in that the cores of the rotor are each generally manufactured by lamination press of steel sheets with good transmittance and are of a cylindrical shape, so that the material yield when stamping out the cores from a belt-like roll material is very low. In the rotor disclosed in PTL 1, too, there has been a problem in that the cores radially inside the magnets are of an integrated structure of steel sheets, so that the material yield in press working is low.

Also, there has been a problem in that just by directly molding the simply divided cores and magnets, when molding, the parts move by an amount equal to clearances secured so as to easily charge the individual parts into a die, and the rotor's outside diameter accuracy after completion of molding decreases, thus worsening the vibration and noise characteristics of the rotary electric machine. Also, there has also been a problem in that the above-described clearances become the resistance of a magnetic circuit, so that it is difficult to increase the efficiency of the rotary electric machine.

The present application has been made to solve the above problem, and an object of the present application is to provide a high-efficiency rotor which can reduce leakage flux, has a good yield of cores, and is high in outside diameter accuracy, a rotary electric machine, and a method of manufacturing the rotary electric machine.

Solution to Problem

A rotor disclosed in the present application includes a main shaft which is an axis of rotation; a first resin portion formed by being filled with a resin so as to surround the periphery of the main shaft; a first core disposed in close contact with the outer circumferential portion of the first resin portion; a magnet attached to the radial outside of the first core; and a second core disposed in close contact with the radially outside end face of the magnet, wherein the rotor is characterized in that a plurality of structures in each of which the magnet is sandwiched between the first and second cores are disposed circumferentially around the main shaft, and a second resin portion is formed between the circumferential end faces of adjacent second cores and between the circumferential end faces of adjacent magnets, that the first core has, between itself and an adjacent first core, a division surface on which the circumferential end faces of itself and the adjacent first core are in surface contact with each other, and that the second core is not in contact with an adjacent second core.

Also, a rotary electric machine disclosed in the present application is characterized by including a stator disposed radially opposite the rotor described above.

Also, a rotary electric machine manufacturing method disclosed in the present application is characterized by including a step in which the resin is filled while pushing, from radially inside, a plurality of the first and second cores, which are circumferentially disposed in close contact with the inner diameter of the rotor, and thereby pressing the first and second cores against a die in contact with the outer diameter of the second cores, thus molding the first resin portion and the second resin portions.

Advantageous Effects of Invention

According to the rotor, the rotary electric machine, and the rotary electric machine manufacturing method disclosed in the present application, it is possible to obtain a high-efficiency rotor which can reduce leakage flux, has a good yield of cores, and is high in outside diameter accuracy, a rotary electric machine, and a method of manufacturing the rotary electric machine.

DESCRIPTION OF EMBODIMENTS

First Embodiment

Hereinafter, a description will be given, based on the drawings, of a first embodiment. In the individual drawings, the same signs show the identical or equivalent portions.

In the present application, axis (axial), radius (radial), inner diameter (radially inside, radially inner direction), outer diameter (radially outside, radially inner direction), and circumference (circumferential), when so described, unless otherwise stated, represent in a cylindrical coordinate system centering around the axis of rotation of a rotor, respectively, rotational axis (rotational axial), radius (radial), relatively radially centripetal (side, direction), relatively radially centrifugal (side, direction), and a circumference (circumferential direction) around the axis of rotation.

Figure 1:
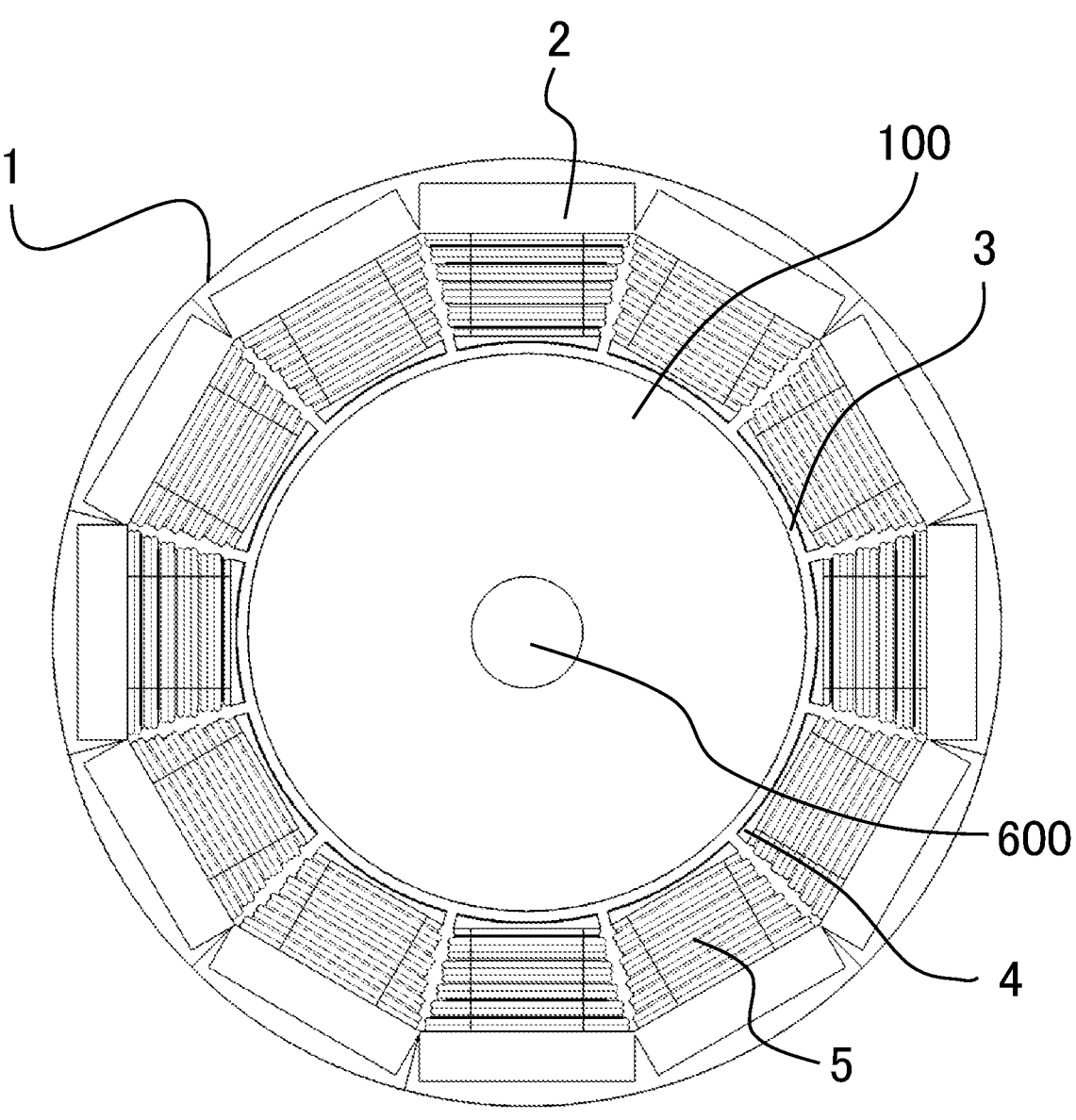
FIG. 1 is a plan view showing a rotary electric machine according to a first embodiment.

FIG. 1 is a plan view of a rotary electric machine 1 according to the first embodiment, as seen from an axial end face. As shown in FIG. 1, the rotary electric machine 1 includes a stator 2 which has teeth 4 protruding radially by an amount equal to the number of slots from respective radially outermost yokes connected in a circle and which has stator windings 5 which, made of a copper wire, are wound one around each of the teeth 4 across an insulating layer (not shown); and a rotor 100 which is integrated with a main shaft 600 and in which magnets 200 are embedded between cores. The stator 2 and the rotor 100 generate or receive magnetic fluxes via an air gap 3 therebetween, allowing the rotating magnetic fields of the stator windings 5 to produce a torque, thus working as the rotary electric machine 1.

Figure 2:
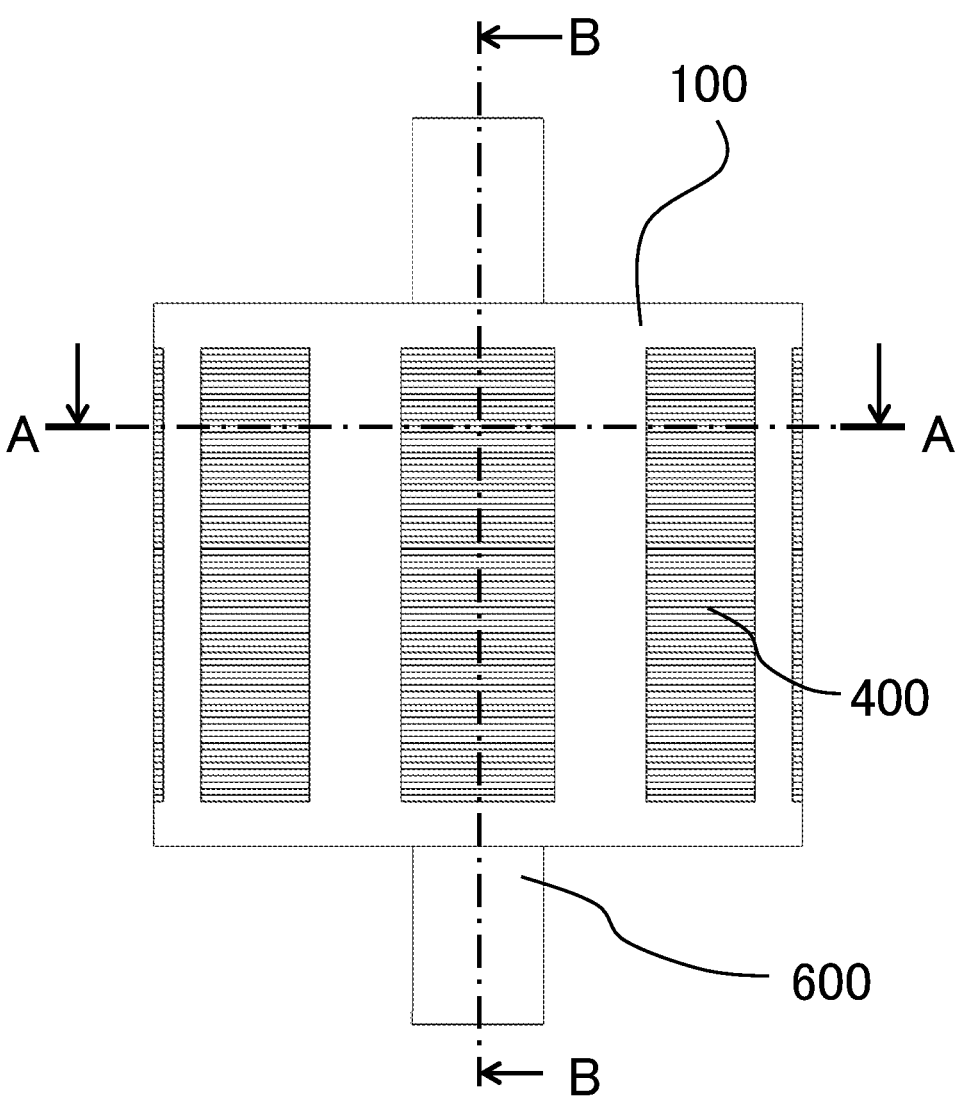
FIG. 2 is a side view showing a rotor of the rotary electric machine according to the first embodiment.
Figure 3:
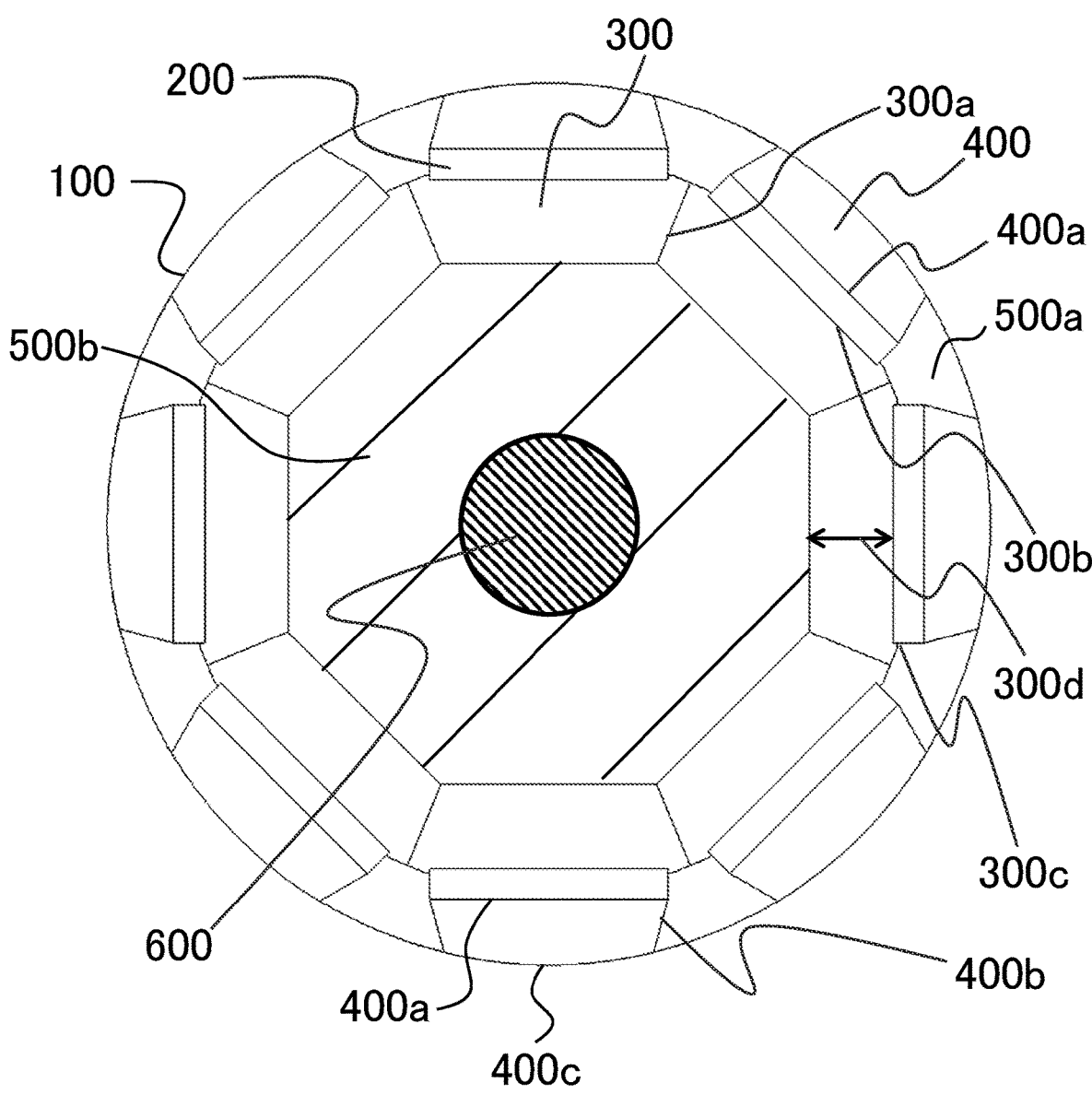
FIG. 3 is a sectional view taken along the line A-A of FIG. 2.

Also, FIG. 2 is a side view showing the rotor of the rotary electric machine according to the first embodiment. Also, FIG. 3 is a sectional view taken along the line A-A of FIG. 2, and FIG. 4 a sectional view taken along the line B-B of FIG. 2.

The rotor 100 is such that the main shaft 600 coincident with the axis of rotation of the rotary electric machine 1 penetrates through the center of the rotor 100 and that a plurality of structures, wherein the magnets 200 are each radially sandwiched between a radially inside core 300 and a radially outside core 400, are circumferentially disposed at predetermined spaced intervals around the main shaft 600 which is the central axis of rotation. Also, the rotor 100 is such that the space between the main shaft 600 and the radially inside cores 300 and the circumferential gaps between adjacent pairs of radially outside cores 400 and magnets 200 are filled with a resin, thereby forming a radially inner filling portion 500*b* and gap filling portions 500*a*, respectively.

The radially outside cores 400 are each in contact with the magnet 200 on a magnet side radially inner end face 400*a*, assuming a role as magnetic paths between the stator 2 and the magnets 200 across a minimal air gap in a radially outer direction. The circumferential end face which is either side surface of the radially outside core 400 has provided thereon a tapered portion 400*b* which has such an angle as to reduce the circular arc length of a radially outermost end face 400*c* of the radially outside core 400 as compared to the length of the magnet side radially inner end face 400*a*.

The radially inside core 300 is in contact with the magnet 200 on the magnet side radially outer end face 300*b*, assuming a role as the magnetic path between circumferentially adjacent magnets 200. A radial thickness 300*d* of the radially inside core 300 is set to minimize the length which can secure the magnetic path which is not saturated with the magnetic flux generated by the magnet 200. The radially inside core 300 is circumferentially juxtaposed to an adjacent radially inside core 300 across a division surface 300*a*. The size of the clearance between adjacent division surfaces 300*a*, being set to minimize the close contact between adjacent radially inner cores 300, may vary within the range in variation of the circumferential dimension between both the circumferential end faces (division surfaces 300*a*) of the adjacent radially inside cores 300. Also, in order to determine the circumferential relative position with respect to the magnet 200, a magnet abutment face 300*c* may be provided as, for example, a circumferential protrusion, when needed.

5

Figure 4:
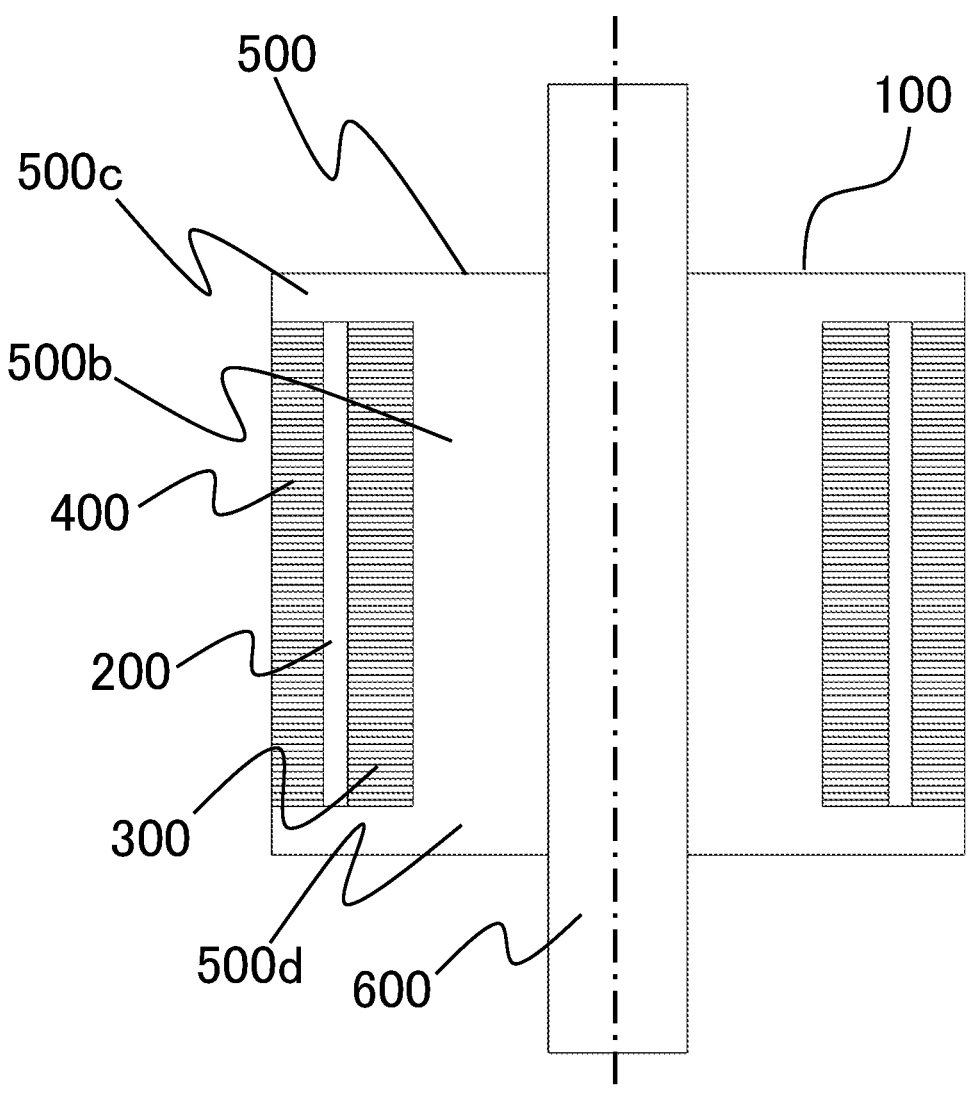
FIG. 4 is a sectional view taken along the line B-B of FIG. 2.

A resin portion 500 is formed by the gap filling portions 500*a* being each filled in the circumferential gap between adjacent pairs of radially outside cores 400 and magnets 200 and, as shown in FIG. 4, being connected to the radially inner filling portion 500*b* by end plate portions 500*c*, 500*d* at both axial ends. Also, the radially inner filling portion 500*b* fixes and holds the main shaft 600 so as to satisfy the required coaxiality with the radially outer end faces of the radially outside cores 400.

The gap filling portions 500*a* enable a decrease in the magnetic fluxes which short-circuit in the circumferential direction of the magnets 200 and a circumferential positioning of the magnets 200 and radially outside cores 400. The end plate portions 500*c*, 500*d* enable the regulation of an axial and a radially outward movement of the magnets 200, radially outside cores 400, and gap filling portions 500*a*. The radially inner filling portion 500*b* enables the regulation of a radially inward movement of the magnets 200, radially outside cores 400, and radially inside cores 300, thus enabling their fixation and positioning with respect to the main shaft 600. The gap filling portions 500*a* are a structural member corresponding to the heretofore known IPM structure bridge, but the resin, as the relative magnetic permeability thereof is equivalent to that of air, does not transfer magnetic fluxes in the circumferential direction.

Figure 5:
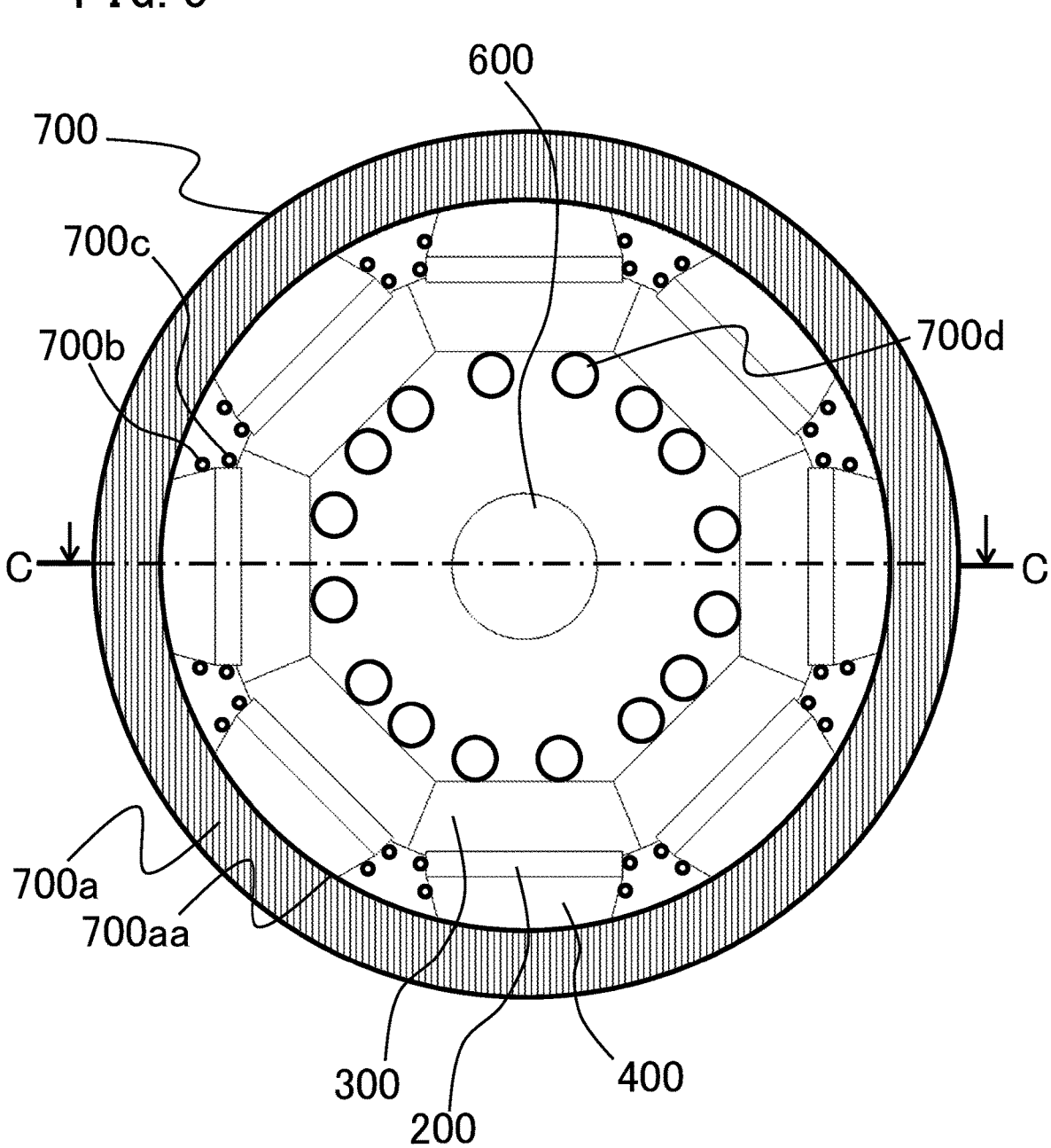
FIG. 5 is a plan view showing the state before molding the resin portions of the rotor according to the first embodiment.

FIG. 5 is a plan view showing the state before molding the resin portions of the rotor according to the first embodiment and, more specifically, shows the state in which the cores and the magnets are charged into a molding die. Also, FIG. 6 is one example of a sectional view taken along the line C-C in the plan view of FIG. 5, looking in the direction of the arrows.

A molding die 700 with which to integrally resin mold the rotor 100 of the rotary electric machine 1 according to the first embodiment includes a lower die 700*a* with which to fix the magnets 200, radially outside cores 400, radially inside cores 300, and main shaft 600, which are rotor members before being molded, and an upper die 700*e* which forms the end plate portion 500*c* and with which to close the molding die 700. A bottom surface 700*g* of the lower die 700*a* is provided with positioning pins 700*b* for determining the circumferential positions of the radially outside cores 400 and similarly with positioning pins 700*c* for determining the circumferential positions of the magnets 200.

Positioning pins 700*d* for positioning the radial end faces of the radially inside cores 300 are disposed radially inside the radially inside cores 300. The positioning pins 700*b*, 700*c*, 700*d* are not necessarily of a cylindrical shape as long as the positioning of the radially inside cores 300, the radially outside cores 400, and the magnets 200 is established and, as required, may be of a tapered shape, of a shape following the outer diameter of the radially inside and outside cores 300 and 400 or the magnets 200, or of a polygonal columnar shape. Also, the number of positioning pins may be increased or eliminated, as appropriate, in cases other than the example shown in FIG. 5. The axial height of the individual positioning pins 700*b*, 700*c*, 700*d* may also be set freely within the range in which they come into contact with the radially outer end faces of the radially inside cores 300, radially outside cores 400, and magnets 200. Protrusions or the like for fixing the radially outside cores 400 to a lower die radially inner end face 700*aa* of the lower die 700*a* may be used in place when they satisfy the function of the positioning pins 700*b*, 700*c*.

Figure 6:
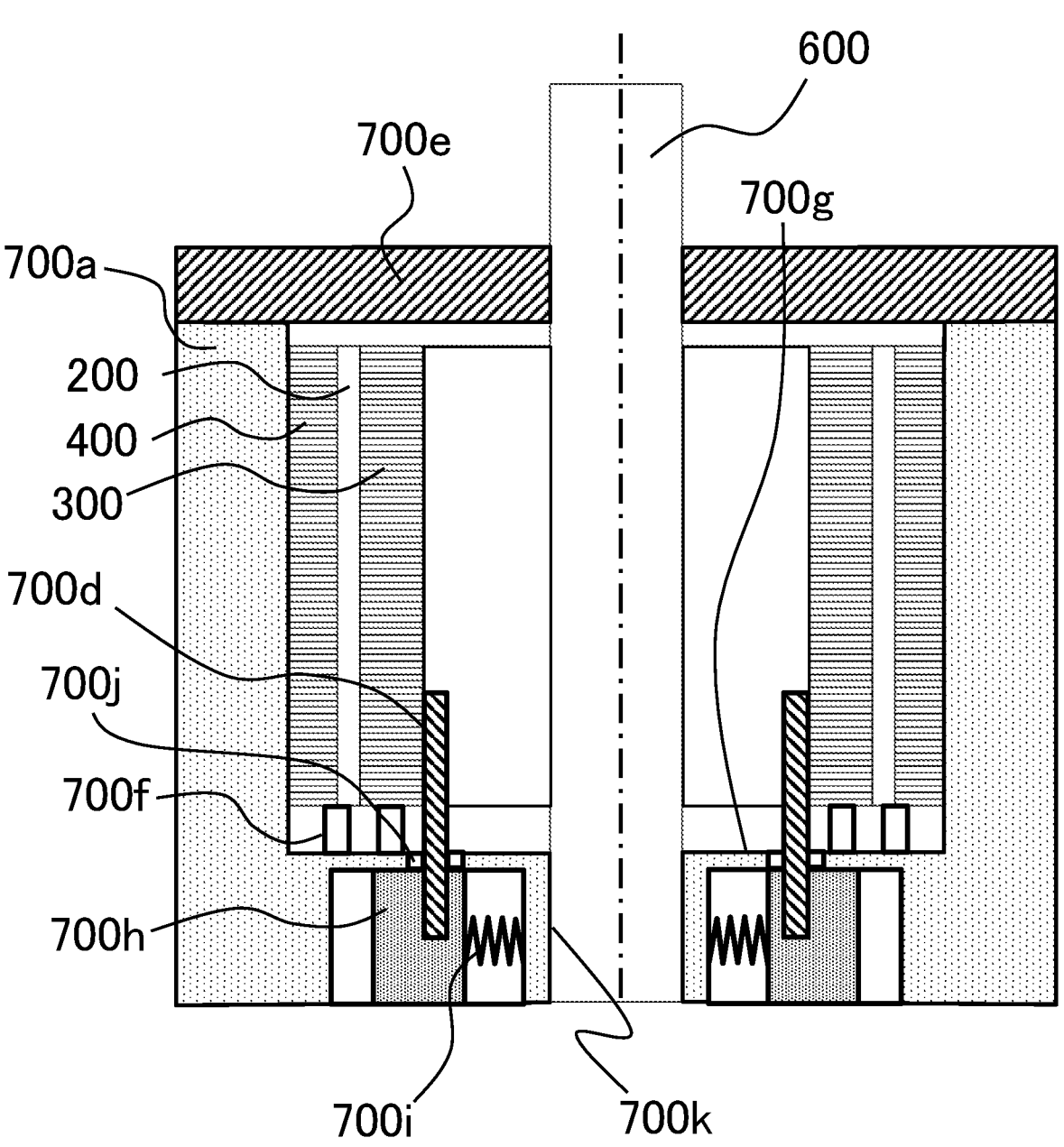
FIG. 6 is a sectional view taken along the line C-C of FIG. 5.

As previously described, FIG. 6 is a sectional view taken along the line C-C of FIG. 5, looking in the direction of the arrows. FIG. 6 shows the positioning pins 700*d* in a transparent view so as to facilitate understanding of the structure. When charging the rotor members into the lower die 700*a*, the end plate portion 500*d* cannot be molded when the rotor members are placed directly on the bottom surface 700*g* of the lower die 700*a*, so that the axial bottom surfaces of the radially outside cores 400, the magnets 200, and the radially inside cores 300 are supported by spacers 700*f* by being raised by an amount equal to the axial thickness of the end plate portion 500*d*. The spacers 700*f* may be either of a pin shape or of a polygonal columnar shape unless the gap filling portions 500*a*, the radially inner filling portion 500*b*, and the end plate portion 500*d* are severed from each other. Also, the spacers 700*f* may, using the same material as the resin with which to mold the end plate portion 500*d*, be formed so as to be one portion of the end plate portion 500*d* after being molded.

The molding die 700 has provided in an arbitrary position therein a gate through which to inject the resin, and the resin is filled in the resin portion 500. The radially outside cores 400, the magnets 200, and the radially inside cores 300 are positioned by the spacers 700*f*, so that the pressure at the time of resin molding acts so as to press the individual members against the lower die radially inner end face 700*aa*, the radially outside cores 400, the magnets 200, and the radially inside cores 300 come into close contact with the lower die radially inner end face 700*aa*, and furthermore, the roundness of the lower die radially inner end face 700*aa* is transferred thereto, thus enabling the outer diameter of the rotor 100 also to obtain a good roundness.

Also, at the time of molding, the main shaft 600 is also inserted into a fit portion 700*k* provided in the center of the bottom surface 700*g* of the lower die 700*a*, thereby enabling integral molding with the coaxiality secured in the molding die 700. Undercorrection in molding pressure is expected depending on a gate position, a core shape, or a tolerance variation, and in this case, the mechanism of pressing the magnets 200 and the individual cores against the lower die radially inner end face 700*aa* may be added actively.

As shown in FIG. 6, void spaces are provided in the bottom surface 700*g* of the lower die 700*a*, and basal portions 700*h* of the positioning pins 700*d* are disposed one each in the void spaces. The basal portions 700*h*, being made to be smoothly slidable in a die radial direction by using an appropriate guide mechanism, each press the radially inner end face of the radially inside core 300 with the repulsive force of a spring 700*i* connected to the lower die 700*a*, thus enabling the magnet 200 and each core to be pressed against the lower die radially inner end face 700*aa*. The positioning pins 700*d* can each be exposed to the die inside through an opening portion 700*j* provided in the bottom surface 700*g* of the lower die 700*a*, and the opening portion 700*j* is set to have a size which does not obstruct the operating stroke of the positioning pins 700*d*. The unexposed portions of the positioning pins 700*d* are each sealed on the upper surface of the basal portion 700*h*, so that it does not happen that the resin flows into the void spaces in the bottom surface 700*g* of the lower die 700*a*.

As another method, a method can also be considered by keeping along the radially outer direction by the elastic restoring force of the radially inside and outside cores 300 and 400, or providing electromagnets in the molding die 700, thus causing the radially inside and outside cores 300 and 400 to stick fast to the lower die radially inner end face 700*aa*. As long as the function of pressing the radially outside cores 400 against the lower die radially inner end face 700*aa* is fulfilled, air pressure, oil pressure, expansion/contraction due to temperature change, or the like, may be utilized as another power source. The power source of the slide mechanism of the basal portion 700*h* also is not limited to a spring.

As above, the cores and the magnets 200 are brought into close contact with and pressed against the lower die radially inner end face 700*aa* which is the die inner circumference, thereby minimizing the magnetoresistance between the magnets 200 and the cores, and it is possible to secure the outside diameter accuracy of the rotor 100.

Figure 7:
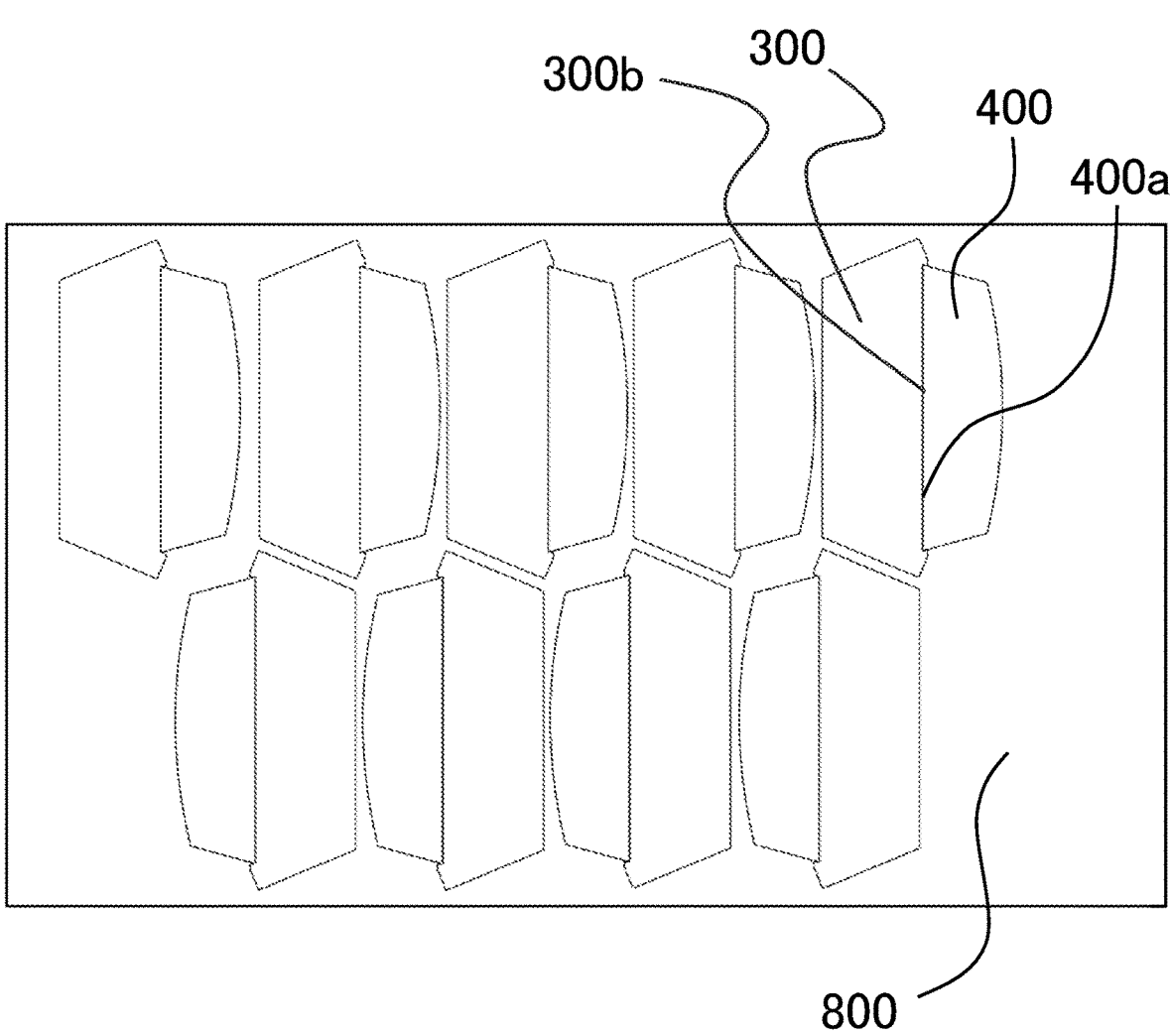
FIG. 7 is a plan view showing the layout in which cores of the rotor according to the first embodiment are disposed in a roll material in press working.

FIG. 7 is a plan view showing the layout when stamping out the cores of the rotor according to the first embodiment, that is, the radially inside cores 300 and the radially outside cores 400, from a core roll material 800 in a press process. The magnet side radially outer end face 300*b* and the magnet side radially inner end face 400*a* are of the same size in circumferential width because of the structure of the rotor 100, so that both end faces can be brought adjacent to or into close contact with each other in a range of enabling press working, as shown in FIG. 7. With the combination of the radially inside and outside cores 300 and 400 as one unit, the combinations are disposed in series in the core roll material 800, as shown in FIG. 7, and thereby it is possible to obtain a good material yield. Also, it is possible, by combining the cores in zigzag form, to further reduce the blanks remaining after stamping out. In this case, the forward direction for sending the core roll material 800 in press working may be either a vertical or a horizontal direction on the sheet in FIG. 7.

According to the rotor 100 and rotary electric machine 1 according to the first embodiment, the portion which corresponds to a bridge of the heretofore known IPM structure is filled with the resin, so that it is possible not only to reduce circumferential leakage fluxes, but to reduce the clearance between each magnet 200 and its corresponding core which results from the dimensional accuracy of the magnets 200 and cores, thus enabling effective utilization of the fluxes inherent in the magnets.

Furthermore, with respect to the air gap 3 which is the radial clearance between the stator 2 and the rotor 100, too, the radially outside cores 400 and the main shaft 600 are molded by being positioned with the molding die 700, so that it is possible to stabilize the dimensions and thus possible to reduce the air gap 3 and improve the roundness.

In addition, out of the radially inside and outside cores 300 and 400, the portions of the size needed for a magnetic circuit only have to be pressed, so that it is possible to significantly reduce the amount of usage of material as compared to the heretofore known rotor wherein circular pressings are laminated one on another. With respect to the yield of the core roll material 800 which is a core material, the cores of the rotor 100 according to the first embodiment have a nearly quadrate shape, so that the cores can be tightly laid out in the plane of the quadrate core roll material 800, as compared to the heretofore known layout in which the plane is filled with circles, thus enabling an improvement in material yield. In addition, the cores required for the stator 2 are not pressed at one time, so that a large press or die is not necessary, and it is thus possible to reduce investment.

The resin with which to fill the rotor 100 is assumed to be a thermosetting resin in the first embodiment, but the material is not particularly limited as long as it is a material low in magnetic permeability compared to that of the cores. The material may be, for example, cement or holohyaline.

Also, in the description of the rotor 100 according to the first embodiment, the cylindrical octal rotor 100 is illustrated as an example, but as long as the configuration of the first embodiment is followed, the rotor may be a rotor with another pole number or a so-called petal rotor wherein the radially outer curvature of the radially outside cores 400 is larger than the radially outermost curvature of the rotor.

As above, the rotor 100 of the rotary electric machine 1 of the first embodiment includes the main shaft 600 which is the axis of rotation; the radially inner filling portion 500*b* which is a first resin portion formed by being filled with the resin so as to surround the periphery of the main shaft 600; a first core which is the radially inside core 300 disposed in close contact with the outer circumferential portion of the radially inner filling portion 500*b* which is the first resin portion; the magnet 200 attached to the radial outside of the first core; and a second core which is the radially outside core 400 disposed in close contact with the radially outside end face of the magnet 200, wherein a plurality of structures in each of which the magnet 200 is sandwiched between the first and second cores are disposed circumferentially around the main shaft 600, and the gap filling portion 500*a* which is a second resin portion is formed between the circumferential end faces of adjacent second cores and between the circumferential end faces of adjacent magnets 200, wherein the first core has, between itself and an adjacent first core, the division surface 300*a* on which the circumferential end faces of itself and the adjacent first core are in surface contact with each other, and wherein the second core is not in contact with an adjacent second core.

Also, the radially inner filling portion 500*b* which is the first resin portion and the gap filling portion 500*a* which is the second resin portion are connected by the end plate portions 500*c*, 500*d* which are third resin portions on both axial end faces of the above-described structure.

Furthermore, the circumferential end face of the radially outside core 400 which is the second core is of a tapered shape in which the circumferential width thereof decreases toward the axial outside.

Also, the rotary electric machine 1 of the first embodiment includes the stator 2 disposed radially opposite the above-described rotor 100.

Also, the method of manufacturing the rotary electric machine 1 of the first embodiment includes a step in which the resin is filled in the molding die 700 while pushing, from radially inside, the plurality of radially inside cores 300 which are the first cores and the plurality of radially outside cores 400 which are the second cores, which are circumferentially disposed in close contact with the inner diameter of the rotor 100, and thereby pressing the first and second cores against the molding die 700 in contact with the outer circumference of the second cores, thus molding the first resin portion which is the radially inner filling portion 500*b* and the second resin portions which are the gap filling portions 500*a*.

According to the rotor 100, rotary electric machine 1, and rotary electric machine manufacturing method according to the first embodiment, it is possible to obtain the high-efficiency rotor 100 which can reduce leakage flux, has an enhanced core yield, and is high in outside diameter accuracy, the rotary electric machine 1, and the rotary electric machine manufacturing method.

Second Embodiment

Figure 8:
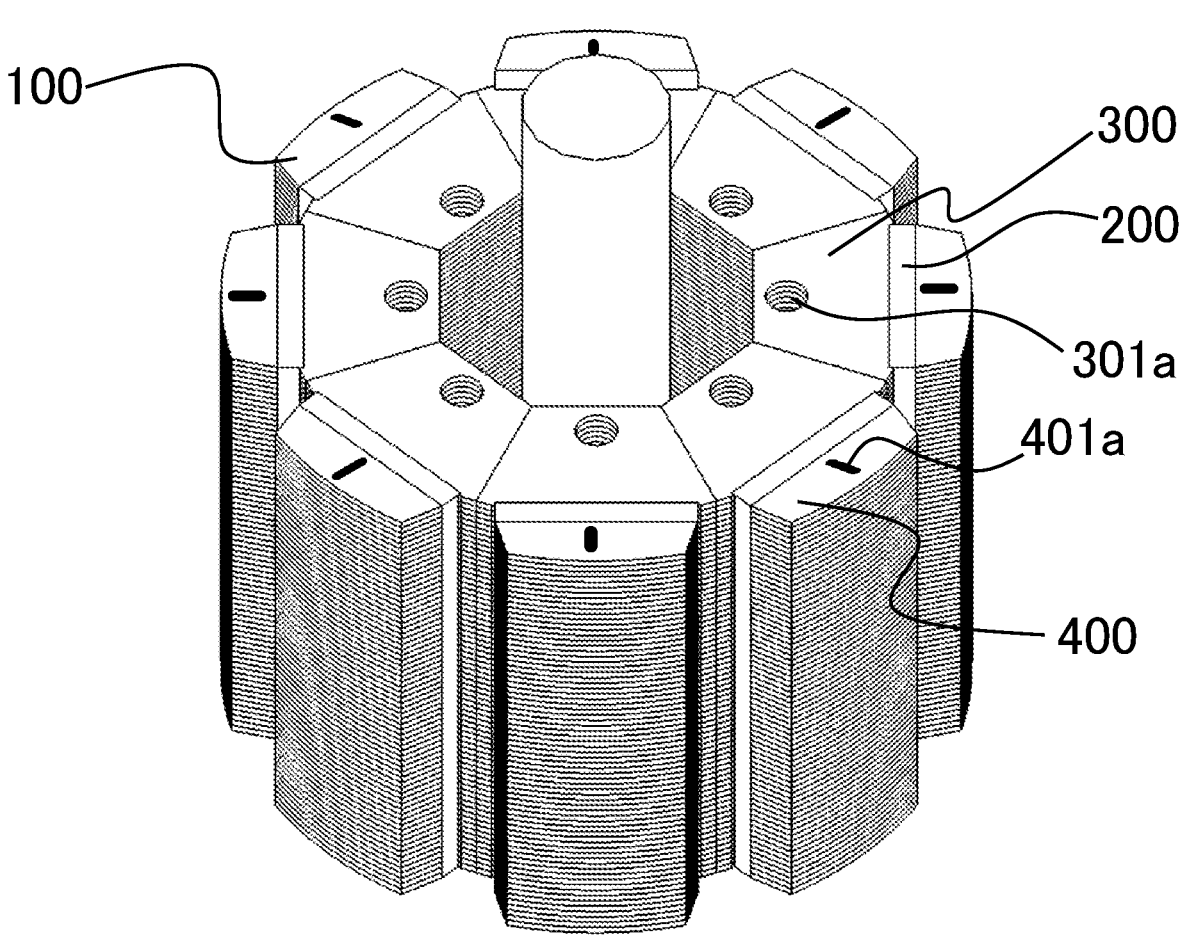
FIG. 8 is a perspective view showing a rotor according to a second embodiment.
Figure 9:
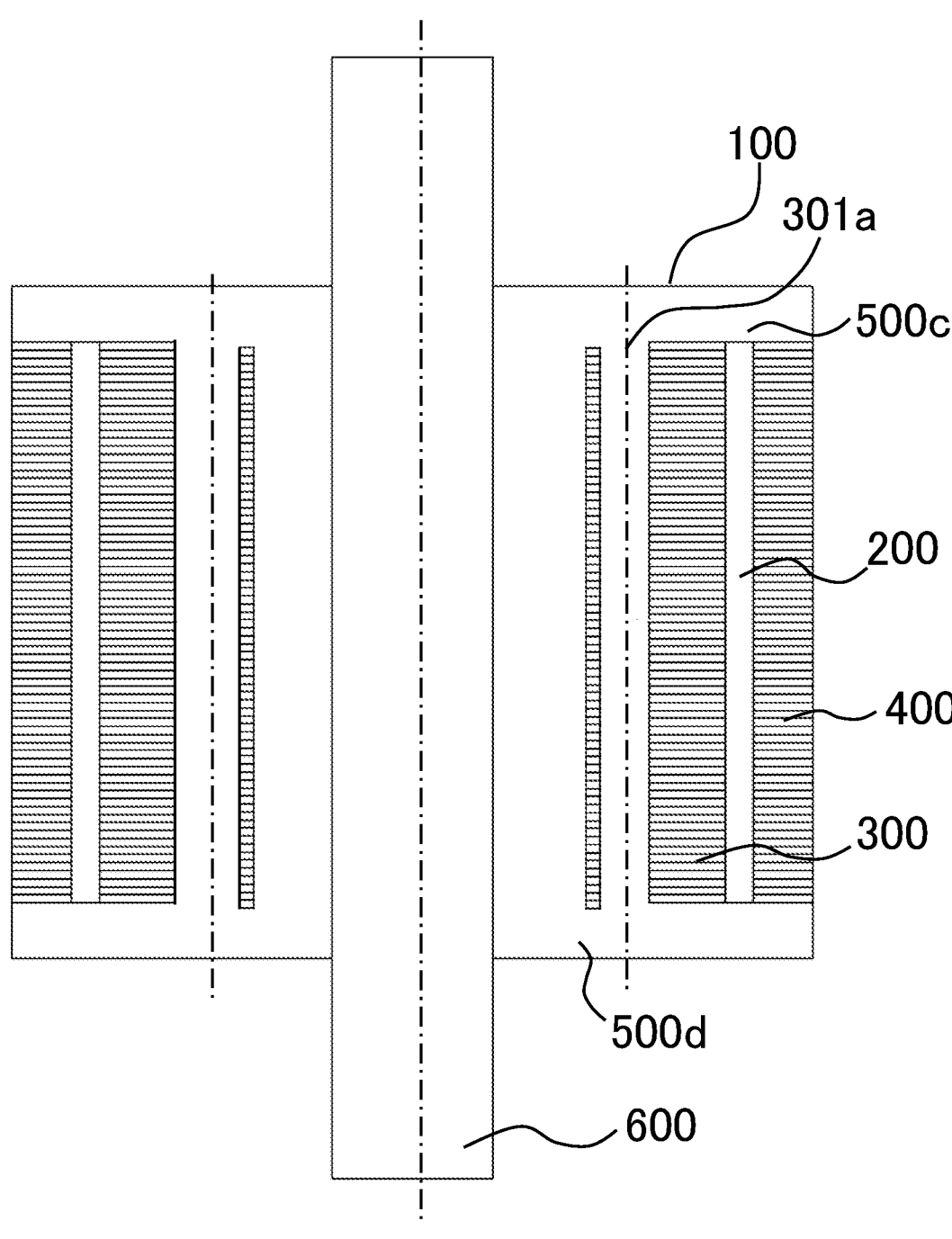
FIG. 9 is a sectional view showing the rotor according to the second embodiment.

FIG. 8 is a perspective view showing a rotor according to a second embodiment. Also, FIG. 9 is a sectional view showing the rotor according to the second embodiment.

Hereinafter, a description will be given, centering on portions different from those of the first embodiment, of the rotor 100 according to the second embodiment. The characteristics of the main shaft 600, magnets 200, cores, and molding die 700 which are not referred to in the following are made the same as in the first embodiment, and the description thereof will be omitted herein.

In the first embodiment, in order to integrate the magnets 200 and the cores as the rotor 100, the gap filling portions 500*a* are provided as the structure members which replace the bridge portions of the cores. The gap filling portions 500*a* are connected to the radially inner filling portion 500*b* via the end plate portions 500*c*, 500*d*, and it is possible, owing to the tapered portions 400*b*, to resist the rotational centrifugal force acting on the cores and the magnets 200. When this configuration is applied to the rotary electric machine 1 which rotates at high speed, however, strength or rigidity becomes insufficient only with the gap filling portions 500*a* depending on the size of the centrifugal force, and there may be concern that the rotor 100 deforms and parts fly apart.

In the second embodiment, there is provided a stronger structure which endures the centrifugal force of the rotor 100.

FIG. 8 shows the state before resin molding of the rotor 100 in the second embodiment. As compared to the radially inside cores 300 of the first embodiment, each radially inside core 300 in the second embodiment, by being extended to a rotor's radially inner portion which is not used for the magnetic circuit, has therein a reinforcement hole 301*a* which passes axially therethrough. Similarly, the radially outside cores 400 also each have therein a reinforcement hole 401*a* of the size which has a low impact on the magnetic circuit. The reinforcement holes 301*a*, 401*a* both do not have to be a circular hole in the range which can allow the impact on the magnetic circuit, and may be polygonal or a slot, and in terms of quantity, too, a plurality of holes may be provided in each core, or a core having no hole portion may be provided.

As shown in FIG. 9, the rotor 100 is molded with the same molding die as in the first embodiment, and thereby the reinforcement holes 301*a* or the reinforcement holes 401*a* are filled with the resin and connected with the end plate portions 500*c*, 500*d*. The resin with which the reinforcement holes 301*a*, 401*a* are filled can receive the rotational centrifugal force with the end plate portions 500*c*, 500*d* as the starting point.

According to the rotor 100 and rotary electric machine 1 in the second embodiment, it is possible, while maintaining the advantages in the first embodiment, to resist a larger rotary centrifugal force, enabling usage in a larger number of rotations.

According to the rotor 100 of the second embodiment, at least either the radially inside cores 300, which are the first cores, or the radially outside cores 400, which are the second cores, each have formed therein the reinforcement hole 301*a*, 401*a* which is the hole portion passing axially therethrough, and the reinforcement hole 301*a*, 401*a* is filled with the resin, thereby forming a fourth resin portion. Also, the fourth resin portions are connected to the end plate portions 500*c*, 500*d* which are the third resin portions.

Consequently, according to the rotor 100 of the second embodiment, the resin which is the fourth resin portions fits the columnar radially inside cores 300 which are the first cores and the radially outside cores 400 which are the second cores, so that it is possible to receive the force in bending direction at the time of torque generation, thereby enabling an improvement in torque transmission intensity.

Third Embodiment

Figure 10:
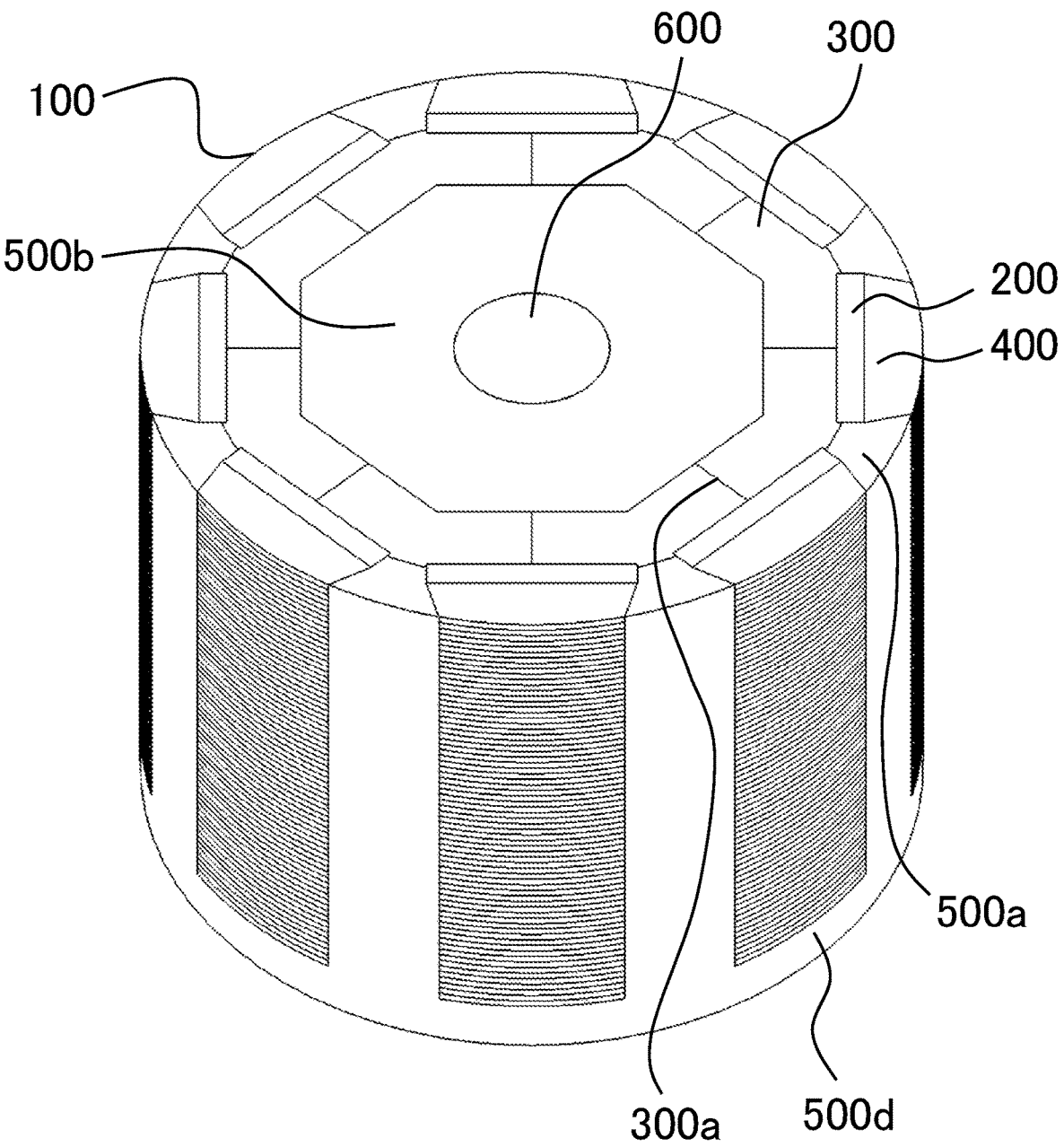
FIG. 10 is a perspective view showing a rotor according to a third embodiment.

FIG. 10 is a perspective view showing a rotor according to a third embodiment. Hereinafter, a description will be given, using FIG. 10, of the rotor 100 and rotary electric machine 1 according to the third embodiment.

In the first embodiment, in order to obtain a good yield in a pressing process, the division surface 300*a* between adjacent radially inside cores 300 is provided circumferentially midway between adjacent magnets 200. The size of the division surface 300*a*, by being set to minimize the close contact between the adjacent cores, has a problem in that a clearance can occur in the range of variation in the finished dimension of the radially inside cores 300, but that the clearance is a portion (that is, a portion through which the magnetic flux passes) used as a magnetic circuit between adjacent magnets 200, so that the density of magnetic flux decreases due to the clearance.

As shown in FIG. 10, the configuration of the rotor 100 according to the third embodiment is characterized in that basically following the structures of the rotors 100 respectively shown in the first and second embodiments, the circumferential division surfaces 300*a* of the radially inside cores 300 are each disposed around the circumferential center of the magnet 200. The shape here of the division surfaces 300*a* is such that adjacent division surfaces 300*a* may have the clearance therebetween in the range which can allow the impact on the magnetic circuit, and the shape does not need to be an axially unitary flat surface, either. The magnetic flux emitted radially inward from the magnet 200 separates with the circumferential center of the magnet as the starting point, forming a magnetic circuit with adjacent two magnets 200, so that there exists almost no magnetic flux crossing the division surface 300*a* in the structure according to the third embodiment.

In the rotor 100 according to the third embodiment, the division surface 300*a* between adjacent radially inside cores 300 which are the first cores is positioned in the circumferential center of the magnet 200.

Consequently, according to the rotor 100 and rotary electric machine 1 in the third embodiment, it is also possible, in addition to the reduction of magnetic flux leakage shown in the first embodiment, to suppress a decrease in the magnetic flux density radially inside the magnet.

Fourth Embodiment

Figure 11:
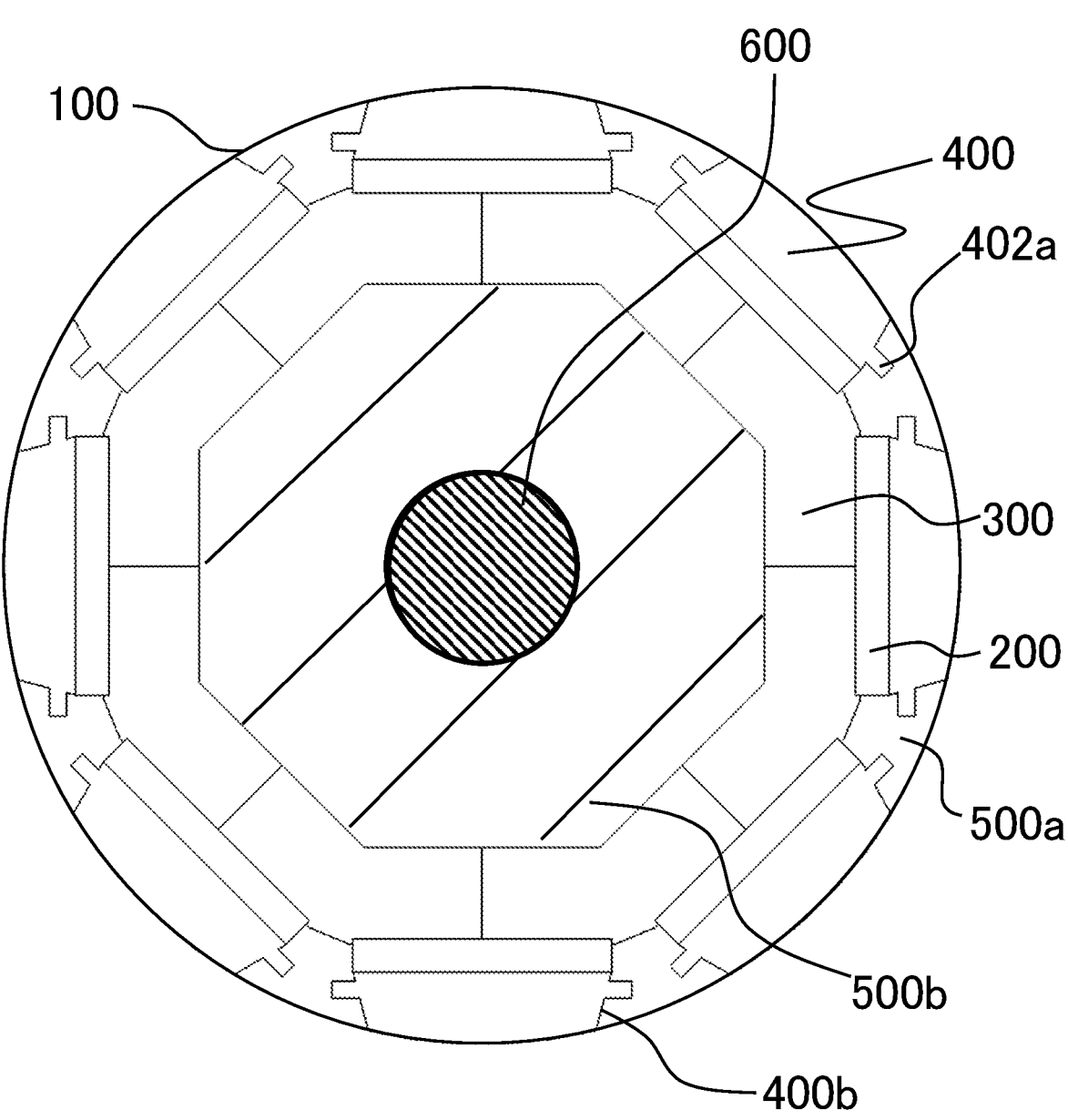
FIG. 11 is a sectional view showing a rotor according to a fourth embodiment.

FIG. 11 is a sectional view showing a rotor according to a fourth embodiment. The configuration of the rotor 100 of the fourth embodiment is aimed at strongly resisting the rotational centrifugal force of the rotor 100. Radially outside cores 400, following the basic shape of the radially outside cores 400 of the first embodiment, each have protruding portions 402*a* one on each of the circumferential end faces having the tapered portions 400*b*. The protruding portions 402*a*, unless they come close to circumferentially adjacent protruding portions 402*a* and form a leakage magnetic flux path, may be polygonal or a curved surface other than such a quadrate shape as shown in FIG. 11. The protruding portions 402*a*, as they connect axially to the end plate portions 500*c*, 500*d*, can resist the centrifugal force of the rotor 100, and by themselves or by being combined with the configuration of the second embodiment, can be applied to the high-speed rotary electric machine 1.

Fifth Embodiment

Figure 12A:
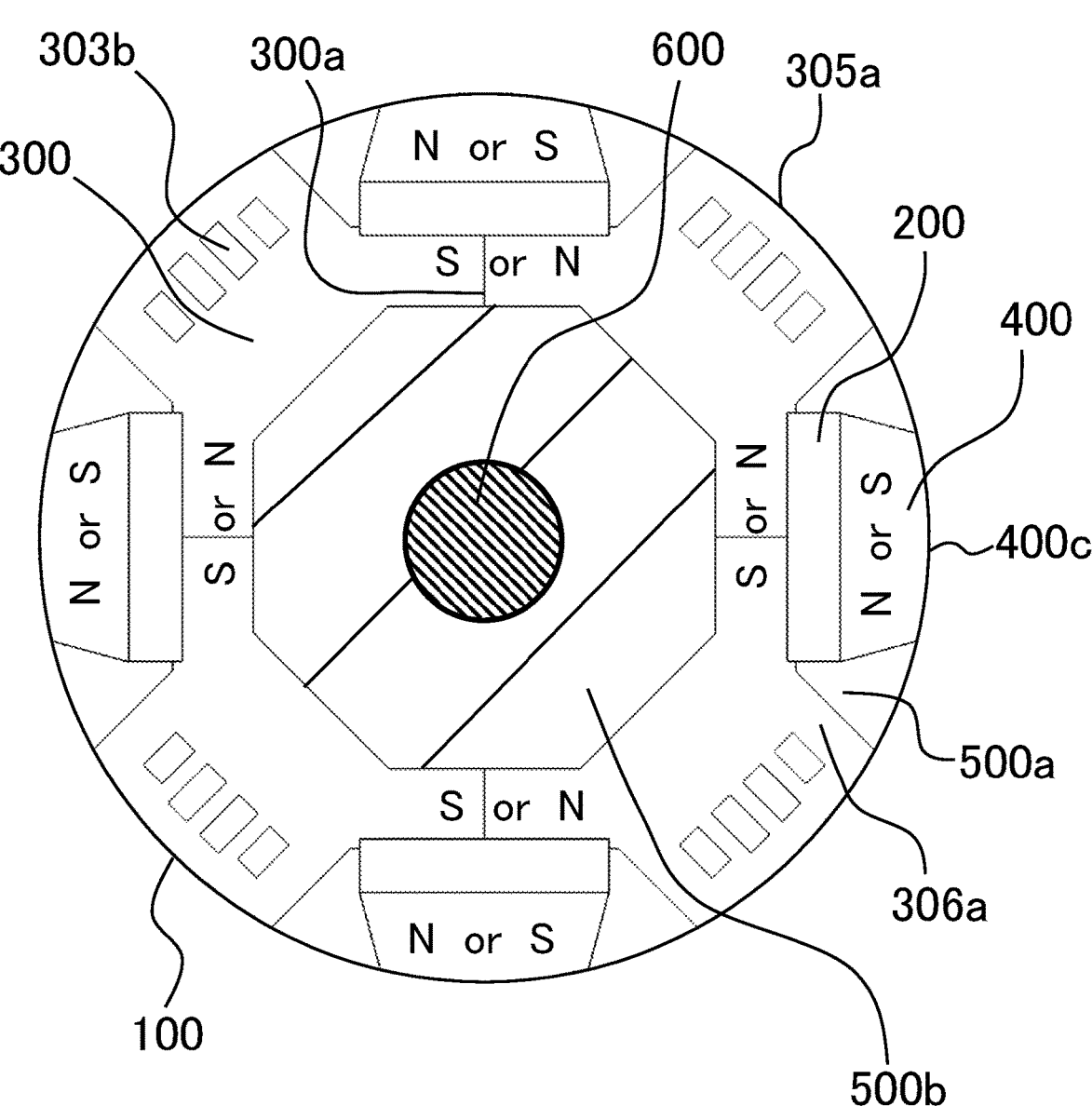
FIG. 12A is a plan view showing a rotor according to a fifth embodiment.

FIG. 12A is a plan view showing a rotor according to a fifth embodiment. Hereinafter, a description will be given, with reference to FIG. 12A, of the rotor 100 and the rotary electric machine 1 according to the fifth embodiment.

In each of the first to fourth embodiments, the radially inside cores 300 and the radially outside cores 400 are configured by being divided into the same number of portions as the number of magnetic poles of the rotor 100, and also, the magnets 200 equal in number to the number of magnetic poles are disposed, but the fifth embodiment provides the structure which enables a reduction in the number of parts and, furthermore, a reduction in the cost of processing the magnets 200.

As shown in FIG. 12A, the rotor 100 adopts a consequent pole structure in which half the total number of magnetic poles is replaced with the cores, thus increasing the thickness of the magnets 200. The rotor 100 is such that the magnets 200 which have on the radially outside the same polarities of the half number of magnetic poles are disposed circumferentially, and the radially outside cores 400 come into close contact with the radially outer end faces, while the radially inside cores 300 come into close contact with the radially inner end faces. The total number of the radially inside cores 300 is half the number of magnetic poles, and adjacent radially inside cores 300 have therebetween the division surface 300a around the circumferential center of each of the magnets 200. Also, the division surface 300a does not have to be a unitary flat surface in the same way as in the third embodiment. The radially inside cores 300 each have a protruding portion 306a which protrudes radially so as to fall between two circumferentially adjacent magnets 200, and radially outermost end faces 305a of the protruding portions 306a of the radially inside cores 300 and radially outermost end faces 400c of the radially outside cores 400 form a magnetic pole as a circular arc having the same radius. Consequently, the gap filling portions 500a are each formed by filling the resin in a void sandwiched between the adjacent radially inside core 300, magnet 200, and radially outside core 400. The radially inside cores 300 may each be placed in a magnetic pole portion which forms the magnetic circuit with the stator 2 and provided with flux barriers 303b for correcting the flow of magnetic flux.

Figure 12B:
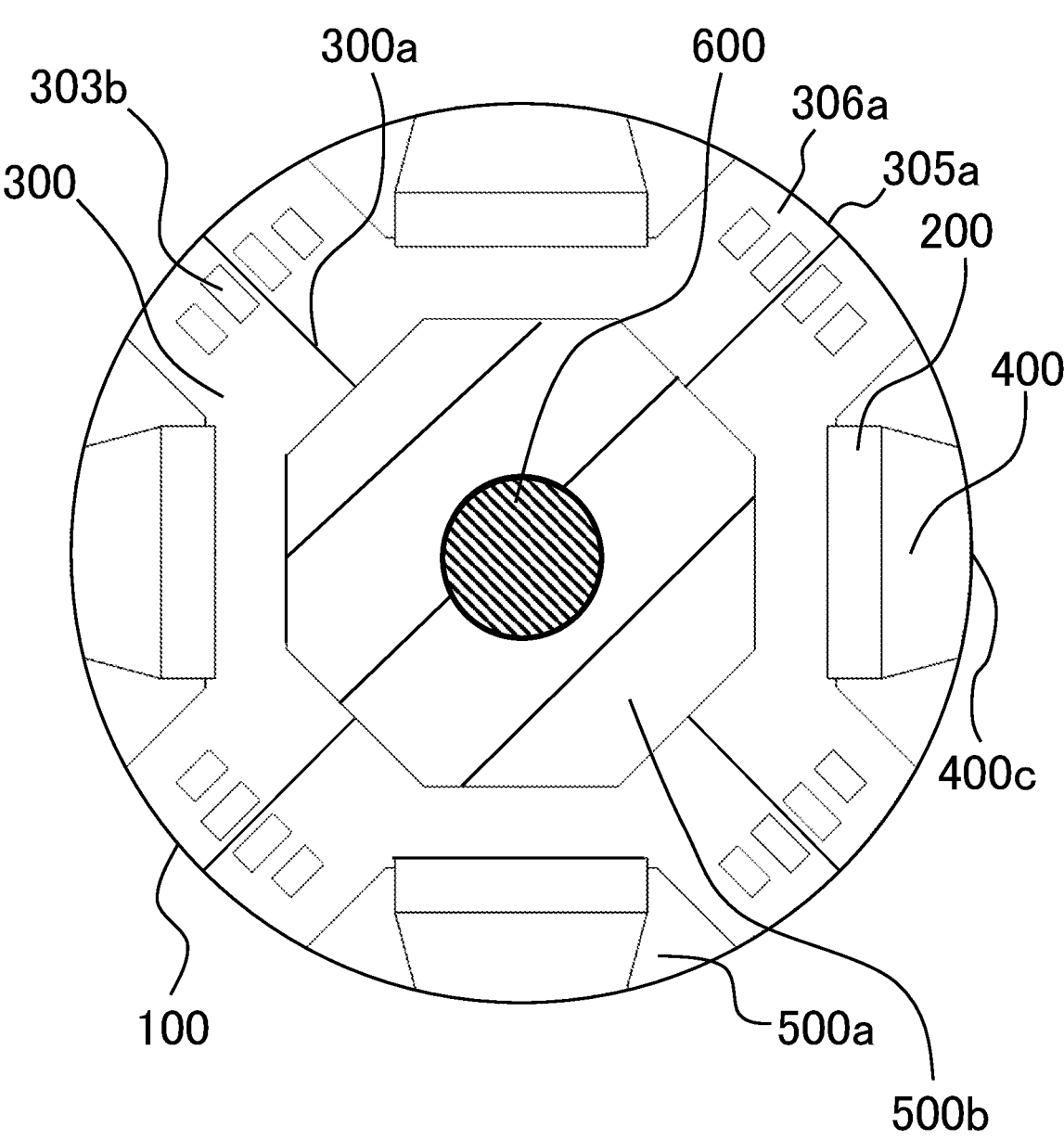
FIG. 12B is a plan view showing a modification example of the rotor according to the fifth embodiment.

FIG. 12B is a plan view showing a modification example of the rotor according to the fifth embodiment. In the modification example of the rotor 100 according to the fifth embodiment, the division surface 300a of each radially inside core 300 is desirably in the center of each polarity which is a surface on which it is difficult for magnetic field lines to cross each other, and as shown in FIG. 12B, the division surface 300a may be disposed in the center of the protruding portion 306a.

According to the rotor 100 and rotary electric machine 1 in the fifth embodiment, the magnets 200, being disposed so as to be equal in number to half the number of magnetic poles, have the same polarities on the radial outside, and the radially inside cores 300 which are the first cores are disposed so as to be equal in number to half the number of magnetic poles. Also, the radially inside cores 300 which are the first cores each have the protruding portion 306a which protrudes between the circumferential end faces of adjacent magnets 200 from radially inside, wherein the radially outermost end faces 305a of the protruding portions of the first cores each form a magnetic pole as a circular arc having the same radius as that of the radially outermost end faces 400c of the second cores, and the circumferential end faces of the protruding portion 306a are each spaced apart from the circumferential end faces of adjacent magnets 200. According to the rotor 100 and rotary electric machine 1 in the fifth embodiment, it is possible, while maintaining the advantages in the first embodiment, to cut the number of parts in half, enabling a curb on the cost of processing the magnets 200, including a reduction in the number of the magnets 200, and a decrease in the difficulty of automatization.

Sixth Embodiment

Figure 13:
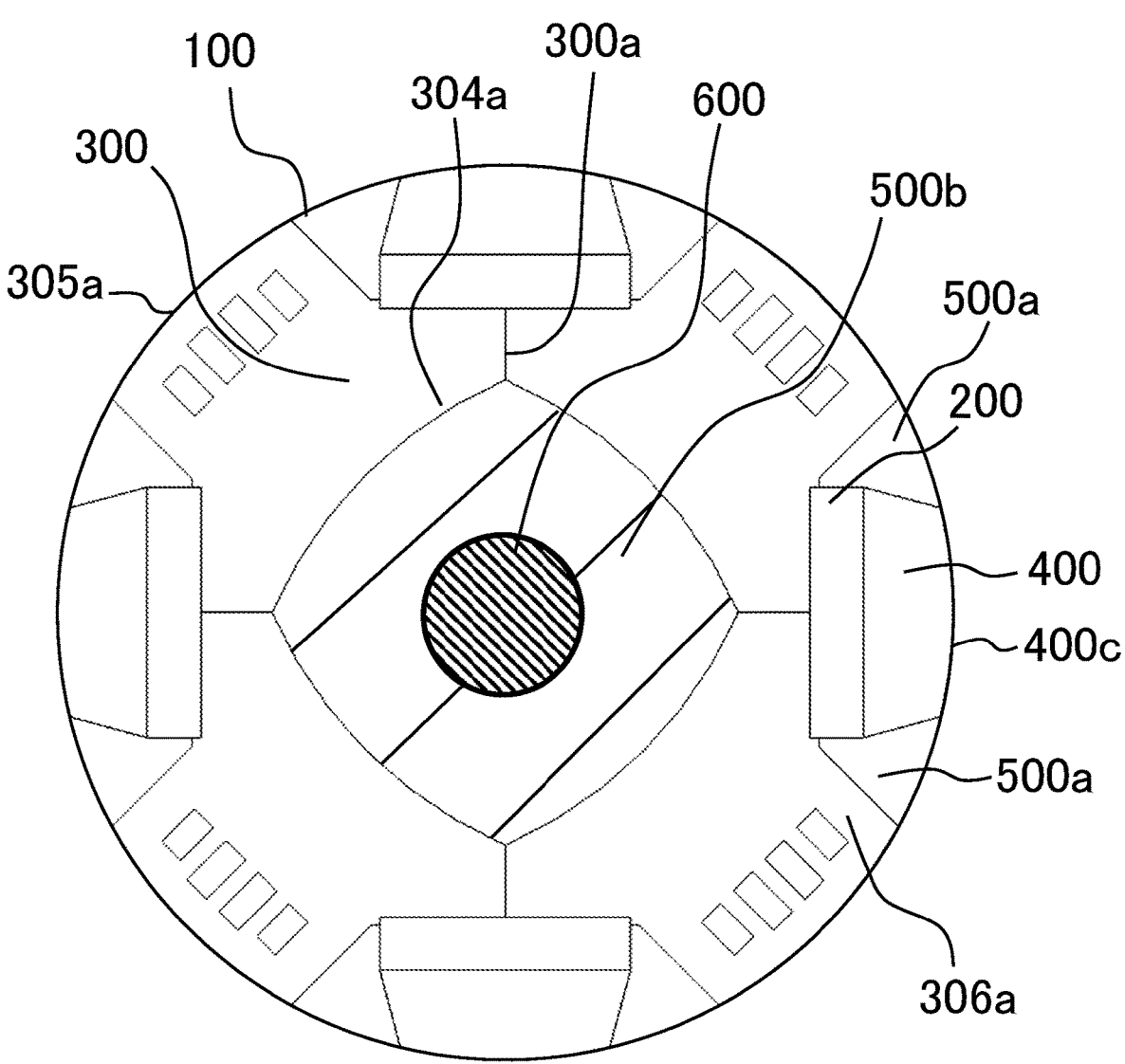
FIG. 13 is a plan view showing a rotor according to a sixth embodiment.
Figure 14A:
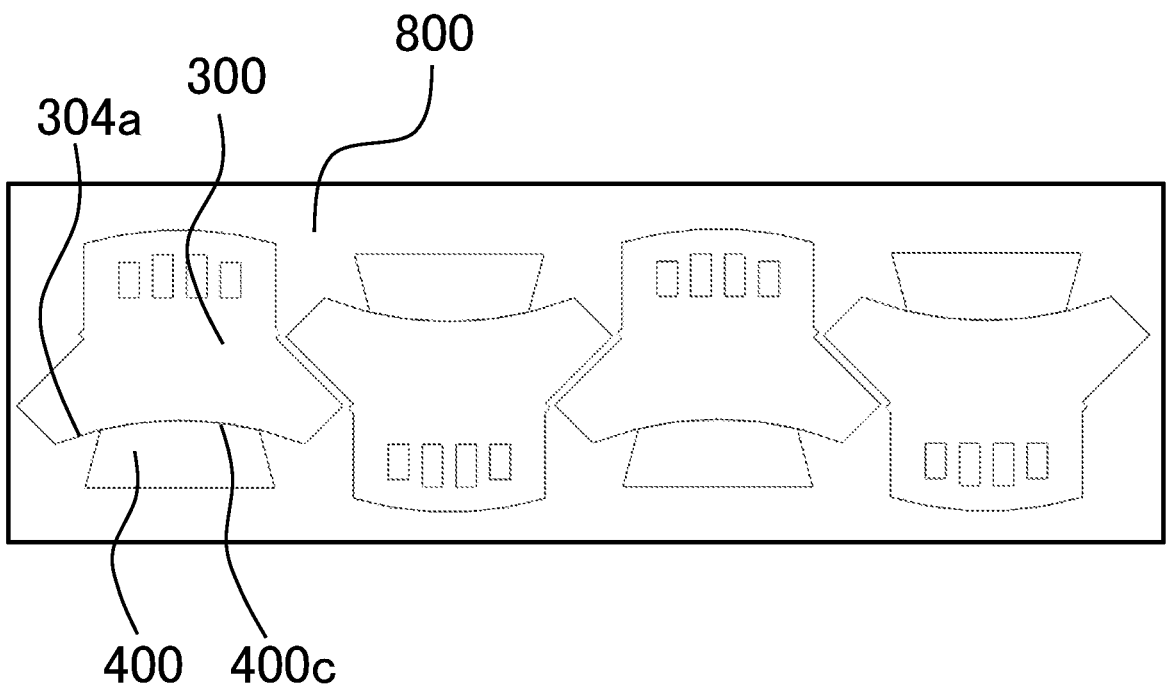
FIG. 14A is a plan view showing the layout in which cores of the rotor according to the sixth embodiment are disposed on a roll material in press working.

FIG. 13 is a plan view showing a rotor according to a sixth embodiment. Also, FIG. 14A is a plan view showing the layout in which the cores of the rotor 100 according to the sixth embodiment are disposed on a roll material in press working. Hereinafter, a description will be given, referring to FIGS. 13 and 14A, of the rotor 100 and rotary electric machine 1 according to the sixth embodiment.

Figure 14B:
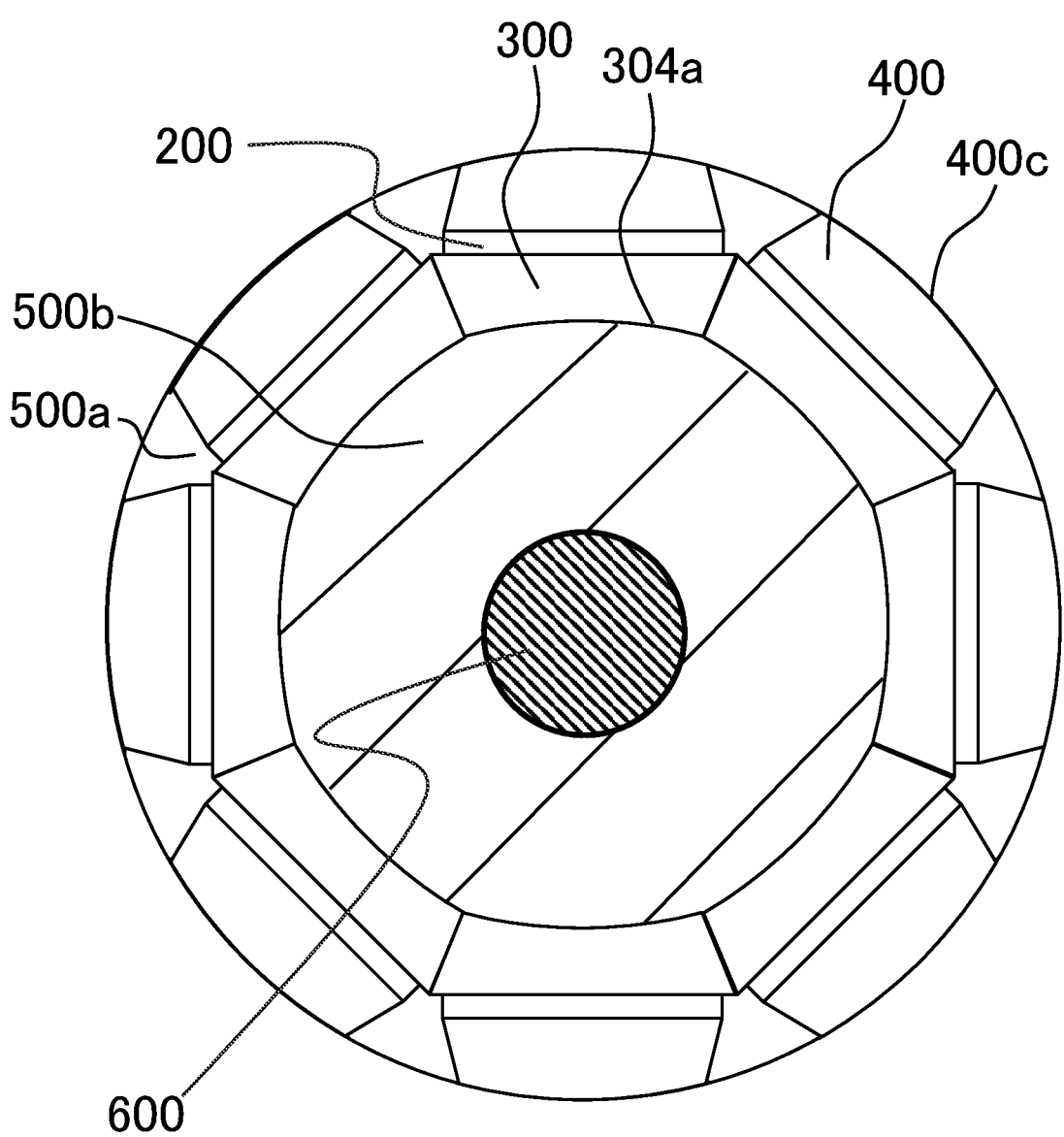
FIG. 14B is a plan view showing a modification example of the rotor according to the sixth embodiment.
Figure 14C:
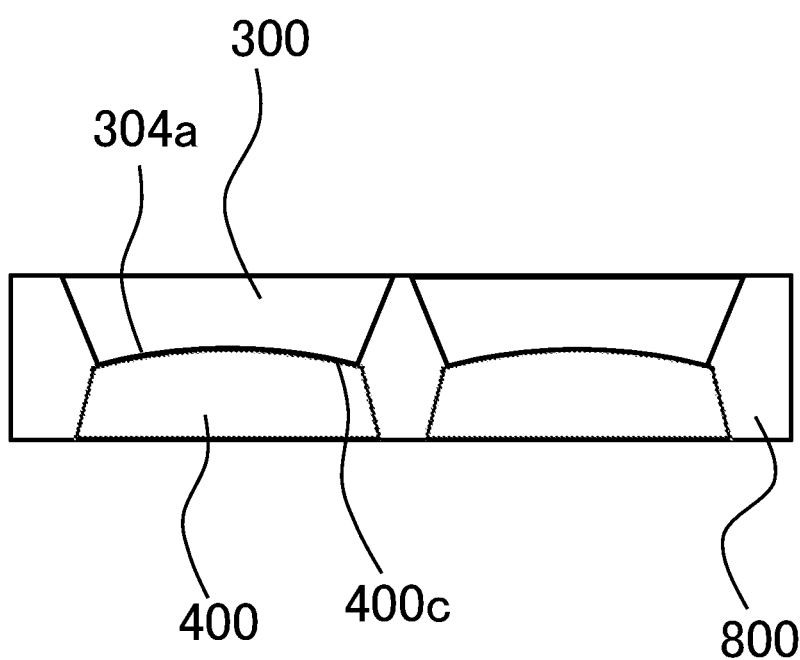
FIG. 14C is a plan view showing the layout in which the cores of the rotor shown in FIG. 14B are disposed on a roll material in press working.

The structure of the rotor 100 in the sixth embodiment mostly follows that of the rotor 100 of the fifth embodiment, and in the sixth embodiment, the rotor 100 is characterized in that a radially innermost end face 304a which is the innermost circumferential surface of each radially inside core 300 has a circular arc with the same curvature as that of the radially outermost end face 400c which is the outermost circumferential surface of the radially inside core 400. By forming this kind of shape, the radially outside cores 400 can be disposed radially inside the respective radially inside cores 300 as the press working layout of the cores on the roll material 800, as shown in FIG. 14A, and it is possible, even in a consequent pole method, to obtain a good material yield in press working. Also, this concept can also be applied to when in another embodiment which is not of the consequent pole method. FIG. 14B is a plan view showing a modification example of the rotor according to the sixth embodiment, and FIG. 14C is a plan view showing the layout in which the cores of the rotor shown in FIG. 14B are disposed on a roll material in press working. As shown in FIGS. 14B and 14C, when the curvature of the radially outermost end faces 400c of the radially outside cores 400 can be made identical to that of the radially innermost end faces 304a of the radially inside cores 300, it is possible to increase the occupancy of the cores in the core roll material 800.

Seventh Embodiment

Figure 15:
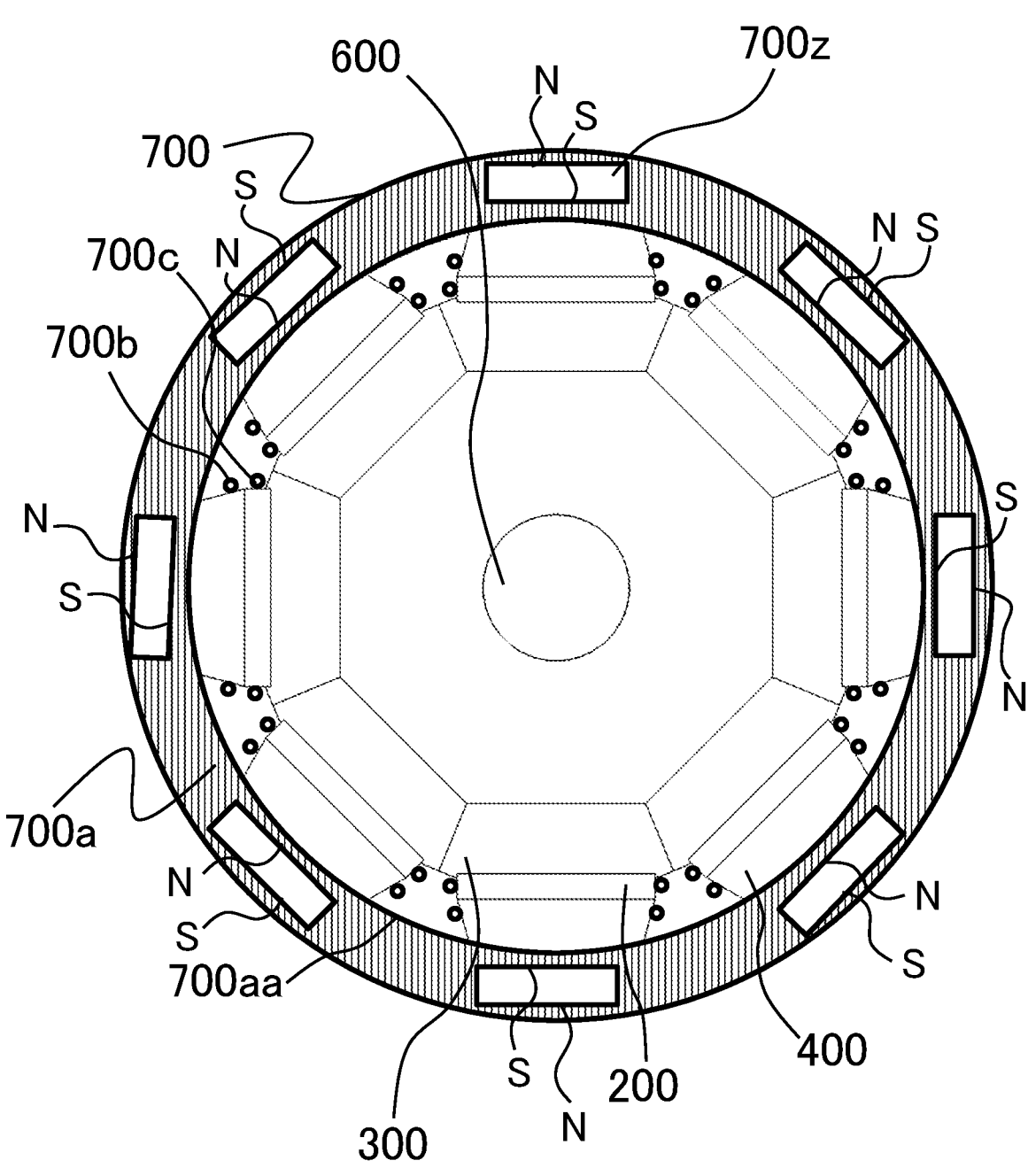
FIG. 15 is a plan view showing the state before molding the resin portion of a rotor according to a seventh embodiment.

FIG. 15 is a plan view showing the state before molding the resin portions of a rotor according to a seventh embodiment and, more specifically, shows the state in which the cores and the magnets are charged into a molding die. As shown in FIG. 15, in the seventh embodiment, permanent magnets or electromagnets 700z are embedded in positions, opposite the radially outside cores 400, of the cylindrical portion of the molding die 700. A resin is filled in the state in which the cores, as they are magnetic, are attracted to the molding die 700 by the magnetic force generated by the permanent magnets or electromagnets 700z, so that it is possible, in the seventh embodiment, to improve the outside diameter accuracy of the rotor 100. In the case of the permanent magnets, they are required to be designed so that a frictional force caused by the magnetic force when mold releasing after molding is weaker than the force of an ejector. In the case of the electromagnets, the magnetic force can be controlled by setting a current.

Figure 16:
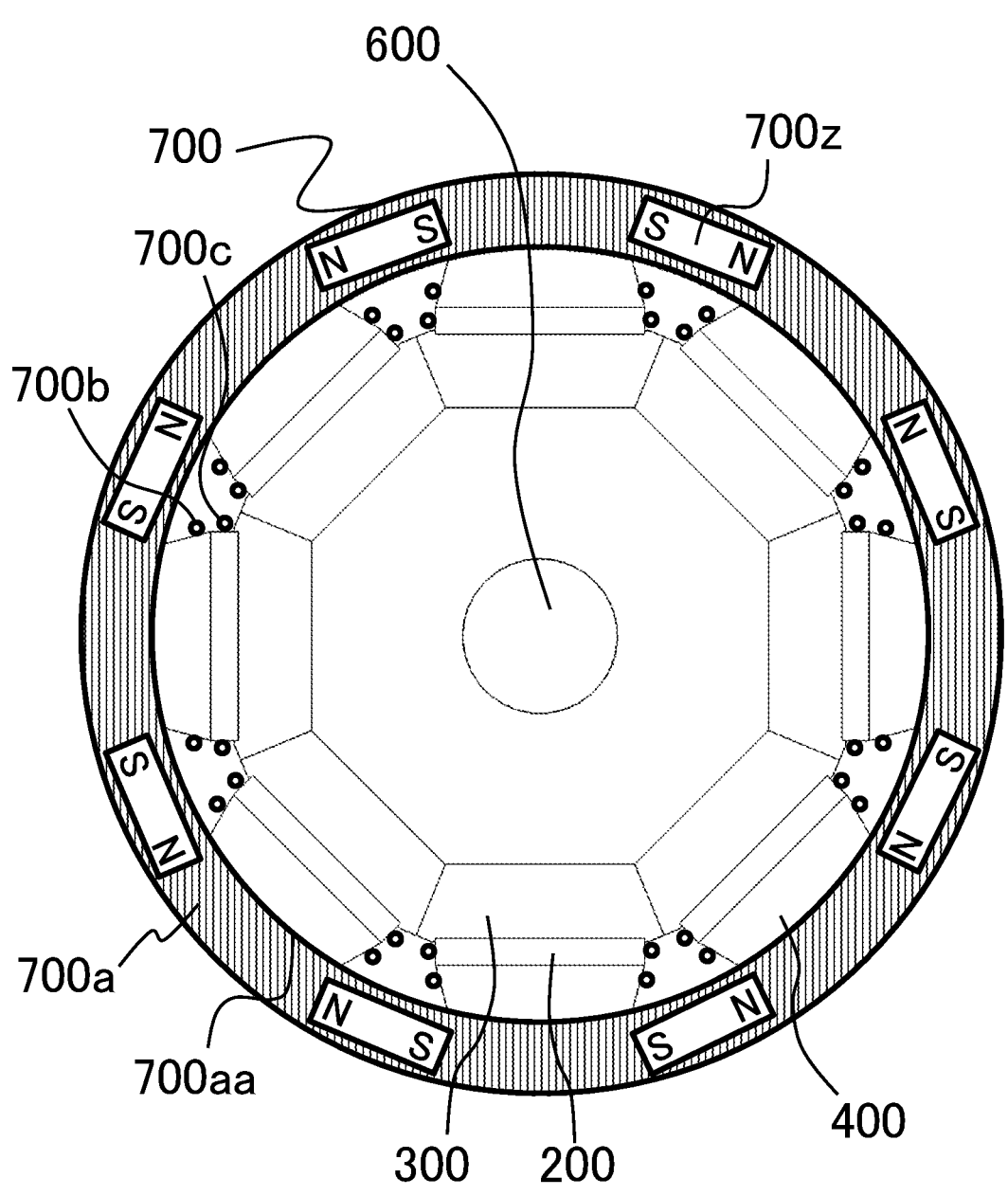
FIG. 16 is a plan view showing a modification example of the state before molding the resin portion of the rotor according to the seventh embodiment.

FIG. 16 is a plan view showing a modification example of the state before molding the resin portions of the rotor according to the seventh embodiment. As shown in FIG. 16, when disposing each of the permanent magnets or the electromagnets 700z between adjacent radially outside cores 400, the cores are attracted by disposing the directions of the magnetic poles as shown in FIG. 16. In the case of the disposition of FIG. 16, the orientation direction of the magnets 200 is elongated along the direction of circumference, so that it is easy to secure the number of windings of the electromagnet, thus enabling a space-saving configuration.

In the seventh embodiment, the magnets to be embedded in the molding die 700 are not all required to be of one kind, the permanent magnets or the electromagnets 700*z*, and the configuration may be, for example, such that some portions are of the permanent magnets and the remaining portions of the electromagnets.

According to the rotor 100, rotary electric machine 1, and rotary electric machine manufacturing method according to the seventh embodiment, they are characterized in that the outer circumferential surfaces of the second cores are attracted to the inner circumferential surface of the molding die 700 by the permanent magnets or electromagnets 700*z* which are disposed in the molding die 700 so as to be opposite the outer circumferential surfaces of the respective radial outside cores 400 which are the second cores. Consequently, according to the seventh embodiment, it is possible to obtain the rotor 100 which is improved in outside diameter accuracy.

Eighth Embodiment

Figure 17:
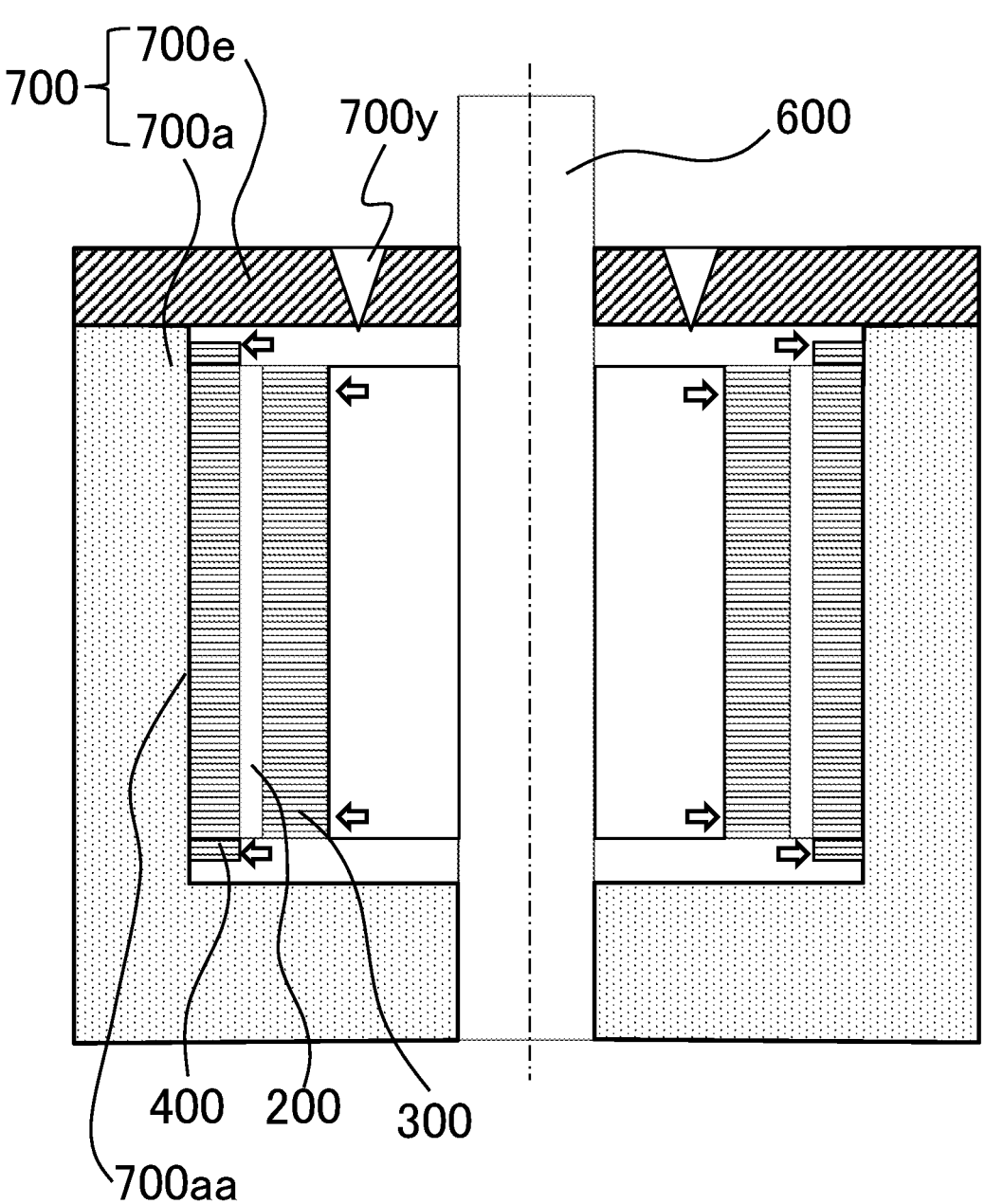
FIG. 17 is a sectional view showing the state before molding the resin portion of a rotor according to an eighth embodiment.

FIG. 17 is a sectional view showing the state before molding the resin portions of a rotor according to an eighth embodiment and, more specifically, shows the state in which the cores and the magnets are charged into the molding die. As shown in FIG. 17, the racially outside cores 400, being greater in axial length than the magnets 200, receive the flowing pressure of the resin in the direction from radially inside to radially outside when filling the resin. Also, in order to lead the resin to flow in the direction in which the radially outside cores 400 are pressed against the lower die radially inner end face 700*aa* which is the inner circumference of the molding die 700, gates 700*y* through which to inject the resin are disposed radially inside the radially outside cores 400. Also, furthermore, it is preferable that the radially inside cores 300 are also brought into close contact with the magnets 200 by being pressed in the radially outer direction, so that it is desirable to dispose the gates 700*y* inside the radially inside cores 300.

Figure 18:
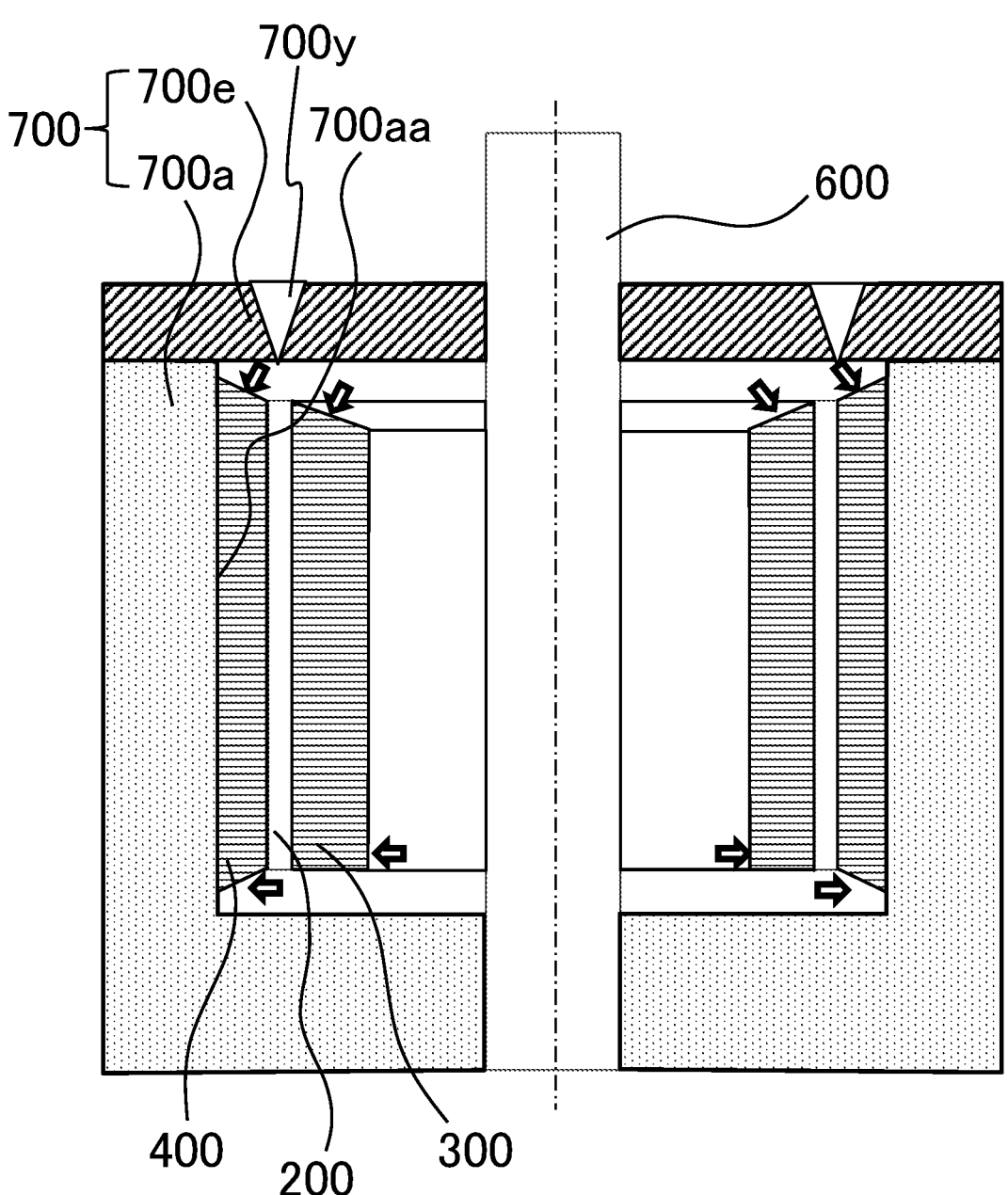
FIG. 18 is a sectional view showing a modification example of the state before molding the resin portion of the rotor according to the eighth embodiment.

FIG. 18 is a sectional view showing a modification example of the state before molding the resin portions of the rotor according to the eighth embodiment. As shown in FIG. 18, when the gates 700*y* cannot be disposed radially inside the radially outside cores 400 due to a constraint on the size of the molding die 700, the portions of the radially outside cores 400 which are axially longer than the magnets 200 are formed into a tapered shape, thereby generating component forces which press the radially outside cores 400 in the radially outer direction, thus enabling the radially outside cores 400 to be pressed against the molding die 700. The inner circumferential side of the radially inside cores 300 can also be formed into a tapered shape in the same way, thereby enabling the radially inside cores 300 to be pressed in the radially outer direction.

The tapered shape can be formed laminated by a moving punch or a plurality of lines of progressive press dies, but a forged iron part or a dust core may be used in place.

As above, according to the rotor 100, rotary electric machine 1, and rotary electric machine manufacturing method according to the eighth embodiment, the radially outside cores 400 which are the second cores, each having the portions longer than the axial length of the magnets 200, are molded by pressing the fluid resin against the portions longer than the magnets 200 and thereby are molded by pressing against the molding die 700. Also, the radially inside cores 300 which are the first cores, each having the tapered shape whose radial thickness decreases from circumferentially inside to circumferentially outside toward the axial end face, are formed by pressing the fluid resin against the tapered shape and thereby the first cores, magnets 200, and second cores are formed by pressing against the molding die 700, and are formed into close contact.

The rotor 100 molded according to each of the first to eighth embodiments is such that the resin is not filled in the portions in which the magnets 200 and the cores are supported by the positioning pins 700*b*, 700*c*, 700*d* or the like, and the portions supported by positioning of the magnets 200 and the cores are exposed.

Figure 19:
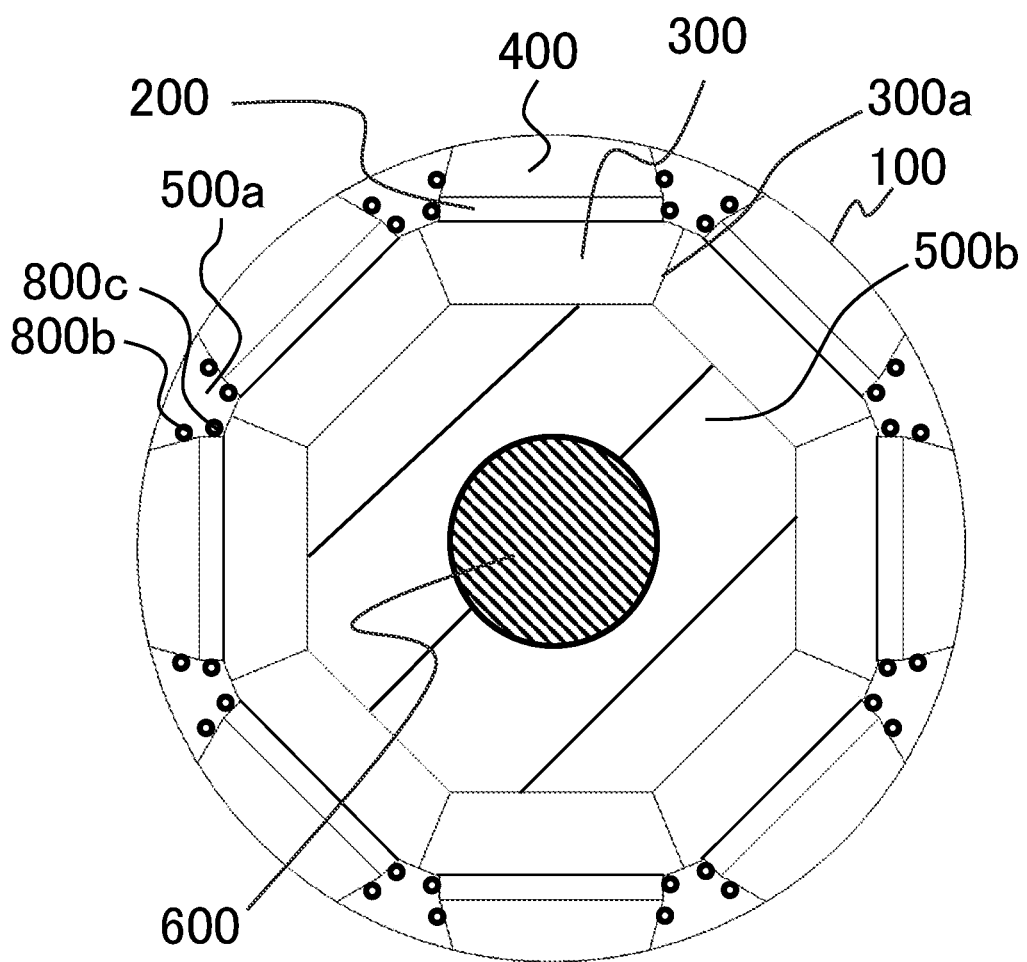
FIG. 19 is a plan view of the rotor according to each of the seventh and eighth embodiments, as seen from the lower die side.

FIG. 19 is a plan view of the rotor according to each of the seventh and eighth embodiments, as seen from the lower die side. As shown in FIG. 19, the rotor 100 is such that the circumferentially positioned portions of the radially outside cores 400 and magnets 200 are exposed. The rotor 100 has, on the circumferential end faces of the magnets 200 thereof, exposed portions 800*c* which are positioning traces, which are not filled with the resin and in which the gap filling portions 500*a* are not formed. The exposed portions 800*c* which are the positioning traces correspond to the positions in which the positioning pins 700*c* have been provided. Also, the rotor 100 has, on the circumferential end faces of the radially outside cores 400 thereof, exposed portions 800*b* which are positioning traces, which are not filled with the resin and in which the gap filling portions 500*a* are not formed. The exposed portions 800*b* which are the positioning traces correspond to the positions in which the positioning pins 700*b* have been provided. The exposed portions 800*c*, 800*b* which are the positioning traces are formed in some or all portions of the circumferential end faces of the magnets 200 and the radially outside cores 400.

Figure 20:
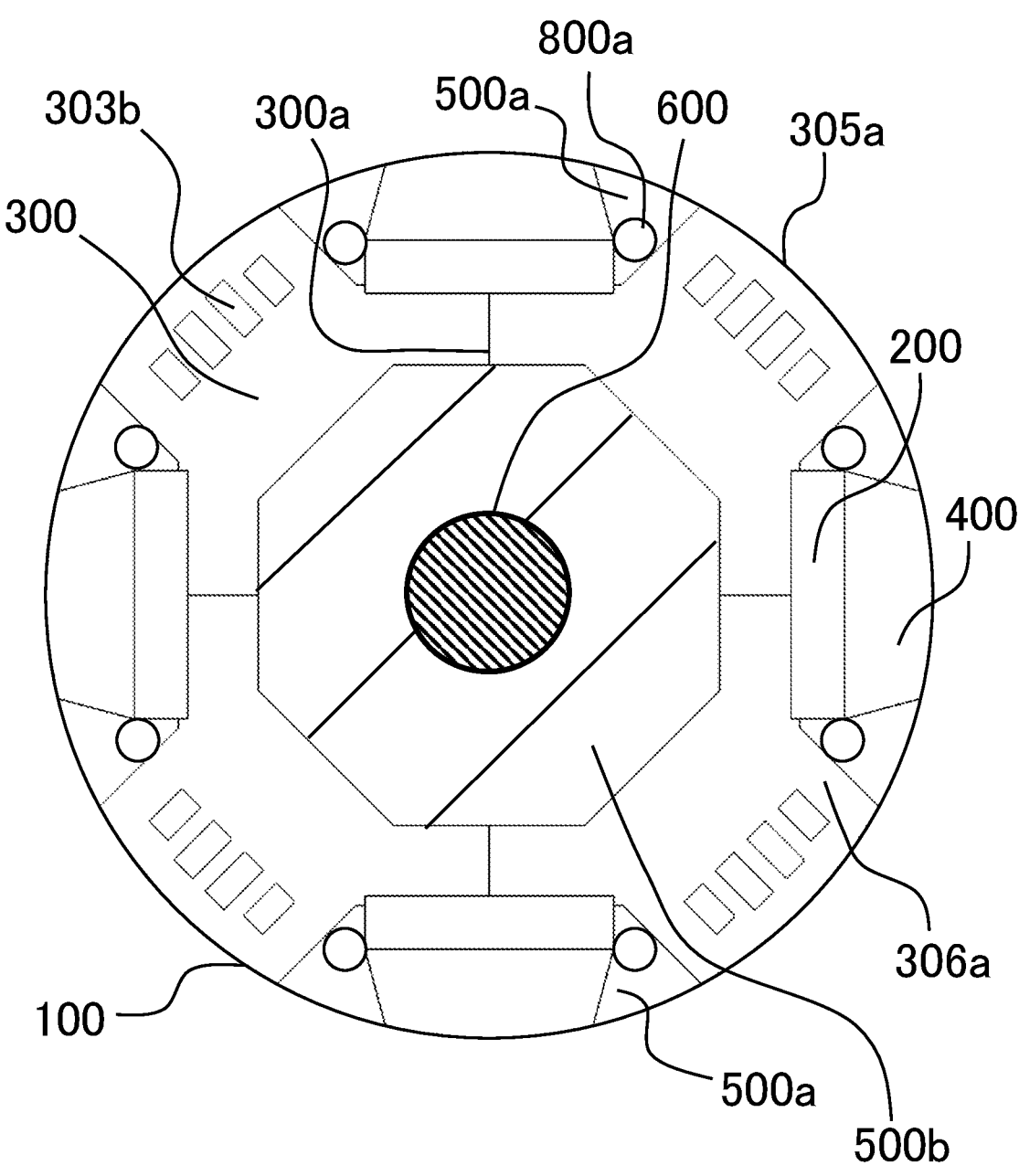
FIG. 20 is a plan view of the rotor according to the fifth embodiment, as seen from the lower die side.
Figure 21:
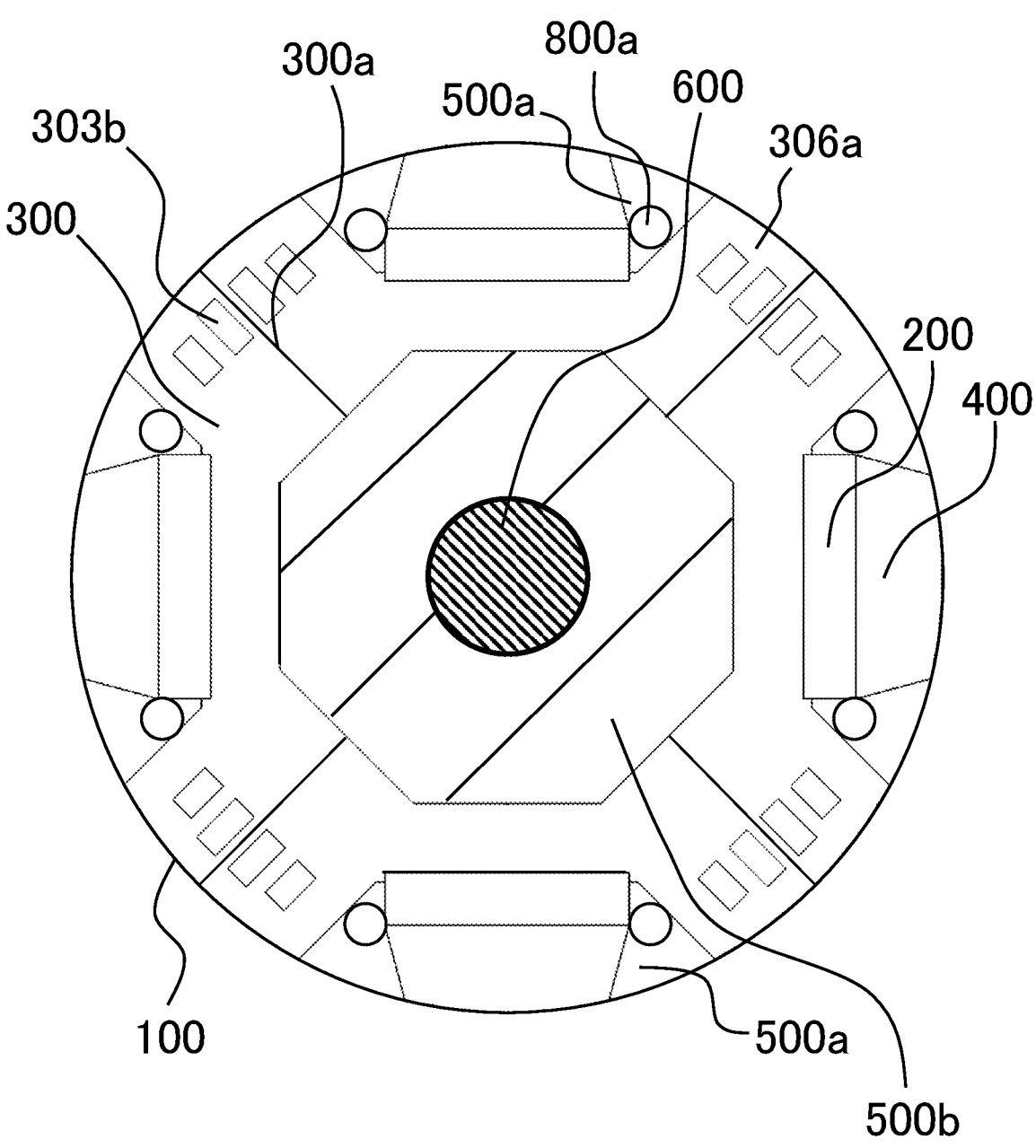
FIG. 21 is a plan view of a modification example of the rotor according to the fifth embodiment, as seen from the lower die side.

Also, in each of the other embodiments too, in the same way, the rotor is characterized in that the portions used for positioning are exposed. FIG. 20 is a plan view of the rotor according to the fifth embodiment, as seen from the lower die side. Also, FIG. 21 is a plan view of a modification example of the rotor according to the fifth embodiment, as seen from the lower die side. For example, in the case of the consequent pole structure which shows the fifth embodiment, the exposed portions 800*a* which are the positioning traces are shaped as in FIGS. 20 and 21. As shown in FIGS. 20 and 21, the rotor 100 has the exposed portions 800*a* which are the positioning traces in which no resin is filled in some or all portions of the circumferential end surfaces of the magnets 200 and in which the gap filling portions 500*a* are not formed. The exposed portions 800*a* which are the positioning traces correspond to the positions in which the positioning pins 700*c*, 700*b* are provided.

Figure 22:
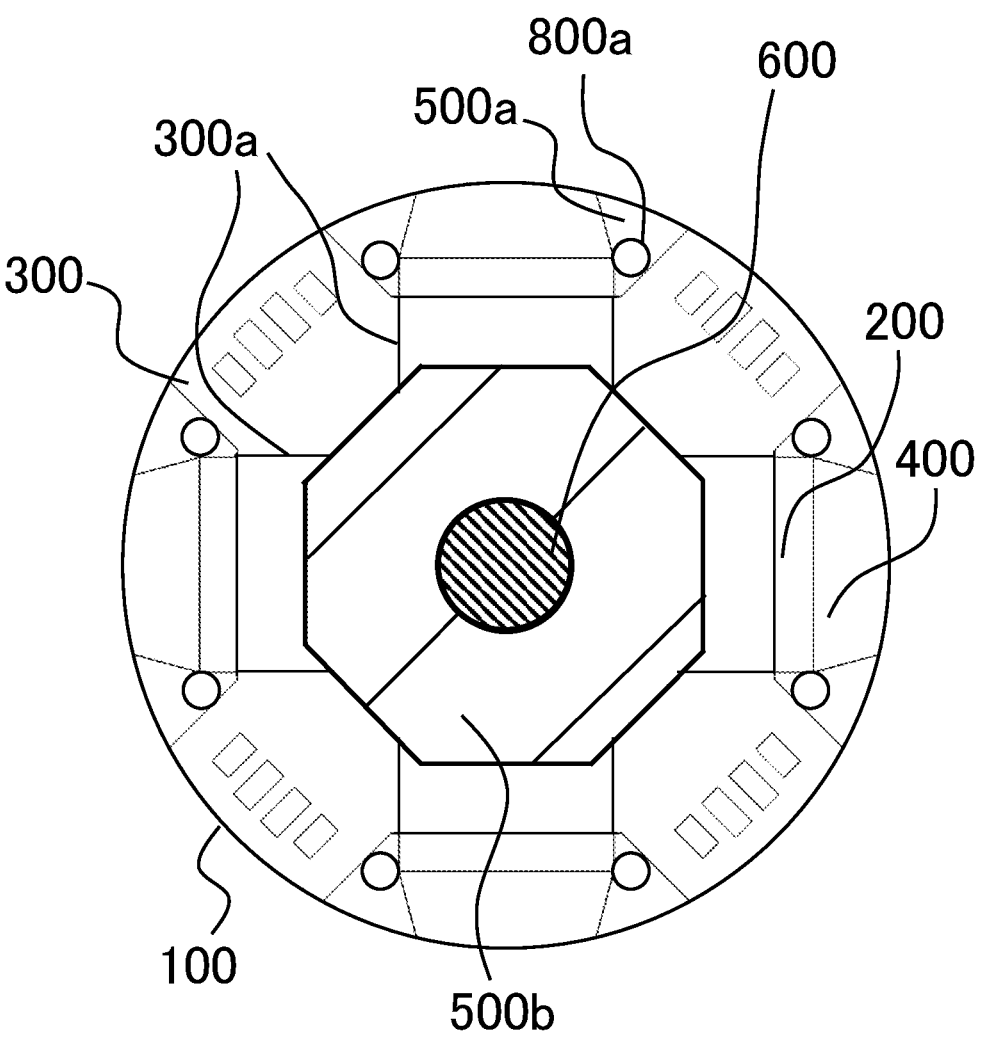
FIG. 22 is a plan view of a second modification example of the rotor according to the fifth embodiment, as seen from the lower die side.
Figure 23:
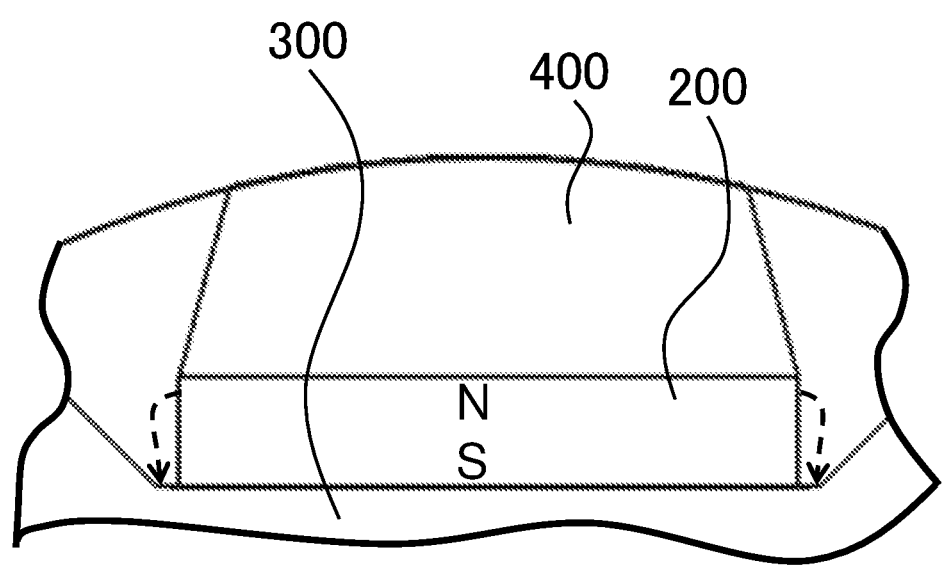
FIG. 23 is an enlarged view of FIGS. 20 to 22, showing leakage fluxes from a magnet to a radially inside core of the rotor.
Figure 24:
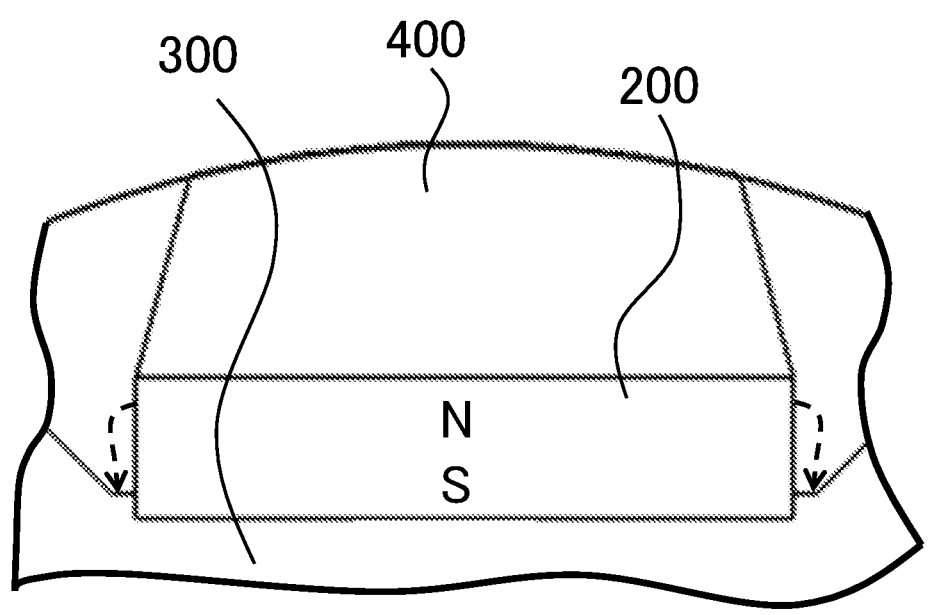
FIG. 24 is an enlarged view of FIG. 12A or 12B, showing leakage fluxes from the magnet to the radially inside core of the rotor.

FIG. 22 is a plan view of a second modification example of the rotor according to the fifth embodiment, as seen from the lower die side. Also, FIG. 23 is an enlarged view of FIGS. 20 to 22, showing leakage fluxes from the magnet to the radially inside core of the rotor. Furthermore, FIG. 24 is an enlarged view of FIG. 12A or 12B, showing leakage fluxes from the magnet to the radially inside core of the rotor.

The radially outside core 400 and the magnet 200 are circumferentially positioned in the positioning shape of the molding die 700, so that it is possible to eliminate a depression of the radially inside core 300 into which to fit the magnet 200, as shown in FIGS. 19 and 23, and possible to reduce the fluxes leaking from the magnet 200 to the radially inside core 300 as indicated by the dashed arrows shown in FIG. 23, thus enabling an increase in the efficiency of the rotor 100.

Also, as shown in FIG. 22, the division surfaces 300a of the radially inside cores 300 are provided, at spaced intervals greater than the circumferential width of the magnets 200, in the same direction as the direction in which the magnets 200 are pressed against the molding die 700, and thereby the radially inside cores 300 can be moved in the thickness direction of the magnets 200 along the radial direction without being subject to reaction force on the division surfaces 300a of the radially inside cores 300, so that it is possible to more actively absorb the variation in the thickness of the magnets 200, thus enabling a reduction in magnetoresistance.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST 1 rotary electric machine, 2 stator, 3 air gap, 4 tooth, 5 stator winding, 100 rotor, 200 magnet, 300 radially inside core, 300a division surface, 300b magnet side radially outer end face, 300c magnet abutment face, 300d radial thickness, 301a reinforcement hole, 303b flux barrier, 304a radially innermost end face, 305a radially outermost end face, 306a protruding portion, 400 radially outside core, 400a magnet side radially inner end face, 400b tapered portion, 400c radially outermost end face, 401a reinforcement hole, 402a protruding portion, 500 resin portion, 500a gap filling portion, 500b radially inner filling portion, 500c, 500d end plate portion, 600 main shaft, 700 molding die, 700a lower die, 700aa lower die radially inner end face, 700b, 700c, 700d positioning pin, 700e upper die, 700f spacer, 700g bottom surface, 700h basal portion, 700i spring, 700j opening portion, 700k fit portion, 700z permanent magnet or electromagnet, 700y gate, 800 core roll material, 800a, 800b, 800c exposed portion

The invention claimed is:

1. A rotor, comprising:
a main shaft which is an axis of rotation;
a first resin portion formed by being filled with a resin so as to surround a periphery of the main shaft;
a first core disposed in close contact with an outer circumferential portion of the first resin portion;
a magnet attached to a radial outside of the first core; and
a second core disposed in close contact with a radially outside end face of the magnet, wherein
a plurality of structures in each of which the magnet is sandwiched between the first and second cores are disposed circumferentially around the main shaft, and a second resin portion is formed between circumferential end faces of adjacent second cores and between circumferential end faces of adjacent magnets,
the first core has, between itself and an adjacent first core, a division surface on which circumferential end faces of itself and the adjacent first core are in surface contact with each other,
the second core is not in contact with an adjacent second core,
the first resin portion and the second resin portion are connected together on both axial end faces of the structure by third resin portions, and
an exposed portion which is not filled with the second resin portion is provided in one or all portions of either circumferential end face of the magnet.

2. The rotor according to claim 1, wherein
the circumferential end faces of the second core are of a tapered shape in which a circumferential width decreases toward radially outside.

3. The rotor according to claim 1, wherein
a fourth resin portion is formed in at least one of the first or second core by filling the resin in an axially penetrating hole portion, and
the fourth resin portion is connected to the third resin portions.

4. The rotor according to claim 1, wherein
the division surface of the first core is positioned in the circumferential center of the magnet.

5. A rotary electric machine, comprising:
a stator disposed radially opposite the rotor according to claim 4.

6. The rotor according to claim 1, wherein
the second core has a protruding portion on either circumferential end faces.

7. The rotor according to claim 1, wherein
an axial length of the second core is greater than an axial length of the magnet.

8. The rotor according to claim 7, wherein
a portion of the second core longer than the axial length of the magnet has a tapered shape in which the radial thickness decreases from radially inside to radially outside toward the axial end face.

9. The rotor according to claim 1, wherein
the first core has a tapered shape in which the radial thickness decreases from radially inside to radially outside toward the axial end face.

10. The rotor according to claim 1, wherein
the magnets equal in number to a number of magnetic poles are disposed.

11. The rotor according to claim 1, wherein
the magnets equal in number to half a number of magnetic poles are disposed and have a same polarity on the radial outside, and
the first cores equal in number to half the number of magnetic poles are disposed.

12. The rotor according to claim 11, wherein
the first core has a protruding portion which protrudes between the circumferential end faces of the adjacent magnets from radially inside,
a radially outermost end face of the protruding portion of the first core forms a magnetic pole as a circular arc of a same radius as that of a radially outermost end face of the second core, and
circumferential end faces of the protruding portion are each spaced apart from the circumferential end face of the adjacent magnet.

13. The rotor according to claim 12, wherein the division surface of the first core is positioned in the circumferential center of the protruding portion.

14. The rotor according to claim 12, wherein the radially innermost end face of the first core is a circular arc having a same curvature as that of the radially outermost end face of the second core.

15. The rotor according to claim 1, wherein a radially innermost end face of the first core is a circular arc having a same curvature as that of a radially outermost end face of the second core.

16. A rotary electric machine, comprising: a stator disposed radially opposite the rotor according to claim 1.

17. A method of manufacturing the rotary electric machine according to claim 16, wherein the outer circumferential surfaces of the second cores are drawn to the inner circumferential surface of the die by permanent magnets or electromagnets disposed in the die so as to be opposite the outer circumferential surfaces of the second cores.

18. A method of manufacturing the rotary electric machine according to claim 16, wherein the second cores, each having a portion longer than the axial length of the magnets, are molded by pressing a fluid resin against the portions longer than the magnets and thereby are molded by pressing against the die.

19. A method of manufacturing the rotary electric machine according to claim 16, wherein the first cores each have a tapered shape in which the radial thickness decreases from circumferentially inside to circumferentially outside toward the axial end face, and the first cores are formed by pressing the fluid resin against the tapered shape and thereby the first cores, magnets, and second cores are formed by pressing against the die, and are formed into close contact.

20. A method of manufacturing a rotary electric machine including a rotor, which has: a main shaft which is an axis of rotation; a first resin portion formed by being filled with a resin so as to surround a periphery of the main shaft; a first core disposed in close contact with an outer circumferential portion of the first resin portion; a magnet attached to a radial outside of the first core; and a second core disposed in close contact with a radially outside end face of the magnet, wherein a plurality of structures in each of which the magnet is sandwiched between the first and second cores are disposed circumferentially around the main shaft, and a second resin portion is formed between circumferential end faces of adjacent second cores and between circumferential end faces of adjacent magnets, wherein the first core has, between itself and an adjacent first core, a division surface on which circumferential end faces of itself and the adjacent first core are in surface contact with each other, and wherein the second core is not in contact with an adjacent second core; and a stator which is disposed radially opposite the rotor, the method comprising:

a step in which the resin is filled while pushing, from radially inside, a plurality of the first and second cores, which are circumferentially disposed in close contact with the inner diameter of the rotor, and thereby pressing the first and second cores against a die in contact with the outer diameter of the second cores, thus molding the first resin portion and the second resin portions.

\* \* \* \* \*